US011441621B2

(12) United States Patent
Hennessy

(10) Patent No.: US 11,441,621 B2
(45) Date of Patent: Sep. 13, 2022

(54) PUMP AND WIPER ASSEMBLY, ASSOCIATED VISCOUS CLUTCH AND ASSOCIATED METHOD

(71) Applicant: Horton, Inc., Roseville, MN (US)

(72) Inventor: David R. Hennessy, Burnsville, MN (US)

(73) Assignee: HORTON, INC., Roseville, MN (US)

( * ) Notice: Subject to any disclaimer, the term of this patent is extended or adjusted under 35 U.S.C. 154(b) by 0 days.

(21) Appl. No.: 17/310,058

(22) PCT Filed: Dec. 18, 2019

(86) PCT No.: PCT/US2019/067119
§ 371 (c)(1),
(2) Date: Jul. 14, 2021

(87) PCT Pub. No.: WO2020/159637
PCT Pub. Date: Aug. 6, 2020

(65) Prior Publication Data
US 2022/0074453 A1      Mar. 10, 2022

Related U.S. Application Data

(60) Provisional application No. 62/799,232, filed on Jan. 31, 2019.

(51) Int. Cl.
*F16D 35/02* (2006.01)
(52) U.S. Cl.
CPC .................... *F16D 35/027* (2013.01)
(58) Field of Classification Search
CPC .............................................. F16D 35/00–029
See application file for complete search history.

(56) References Cited

U.S. PATENT DOCUMENTS 2,166,961 A    7/1939  Marsh
2,524,389 A   10/1950  Lalonde
(Continued)

FOREIGN PATENT DOCUMENTS

DE    3819519 A1   12/1989
DE   19810905 A1    9/1999
(Continued)

OTHER PUBLICATIONS

International Search Report and Written Opinion in corresponding International Patent Application PCT/US2019/067119 dated Apr. 27, 2020.

*Primary Examiner* — Timothy Hannon
(74) *Attorney, Agent, or Firm* — Westman, Champlin & Koehler, P.A.

(57) ABSTRACT

A viscous clutch includes an input member rotatable about an axis of rotation, an output member selectively rotatable about the axis of rotation, a working chamber bounded by the input member and the output member, a reservoir, a release bore that fluidically connects the reservoir to the working chamber, a leading wiper that extends into the working chamber, a leading pump bore positioned adjacent to the leading wiper that fluidically connects the working chamber to the reservoir, a trailing wiper that extends into the working chamber, and a trailing pump bore positioned adjacent to the trailing wiper and downstream of the leading pump bore that fluidically connects the working chamber to the reservoir. The trailing wiper has a width that is greater than a width of the leading wiper.

23 Claims, 10 Drawing Sheets

(56) References Cited

U.S. PATENT DOCUMENTS

| | | |
|---|---|---|
| 2,785,533 A | 3/1957 | Thompson |
| 3,042,163 A | 7/1962 | Lapsley |
| 3,184,022 A | 5/1965 | Olson |
| 3,403,764 A | 10/1968 | Sutaruk |
| 3,670,498 A | 6/1972 | Becker |
| 3,741,359 A | 6/1973 | Leichliter |
| 3,934,415 A | 1/1976 | Becker |
| 3,999,385 A | 12/1976 | Hoeller et al. |
| 4,046,239 A | 9/1977 | Tinholt |
| 4,134,484 A | 1/1979 | Lansinger |
| 4,266,645 A | 5/1981 | Crooks |
| 4,351,426 A | 9/1982 | Bopp |
| 4,362,226 A | 12/1982 | Gee |
| 4,403,757 A | 9/1983 | Shepherd |
| 4,405,039 A | 9/1983 | Hauser |
| 4,441,599 A | 4/1984 | Storz |
| 4,457,417 A | 7/1984 | Light |
| 4,560,331 A | 12/1985 | Sanderson |
| 4,574,929 A | 3/1986 | Hayashi et al. |
| 4,665,694 A | 5/1987 | Brunken |
| 4,667,791 A | 5/1987 | Martin et al. |
| 4,806,990 A | 2/1989 | Tahara |
| 4,924,985 A | 5/1990 | Kennedy |
| 4,924,987 A | 5/1990 | Kennedy |
| 4,930,458 A | 6/1990 | Takikawa et al. |
| 4,938,329 A | 7/1990 | Kennedy |
| 4,940,121 A | 7/1990 | Digele |
| 4,969,920 A | 11/1990 | Kennedy |
| 5,022,507 A | 6/1991 | Kennedy et al. |
| 5,042,629 A | 8/1991 | Elmer |
| 5,070,980 A | 12/1991 | Nakagawa |
| 5,099,803 A | 3/1992 | Nakamura |
| 5,111,923 A | 5/1992 | Kennedy |
| 5,119,921 A * | 6/1992 | Drennen ............... F16D 35/023 192/82 T |
| 5,452,782 A | 9/1995 | Inoue |
| 5,593,013 A | 1/1997 | Yamauchi |
| 5,803,221 A | 9/1998 | Kawada et al. |
| 5,855,265 A | 1/1999 | Kennedy |
| 5,893,442 A | 4/1999 | Light |
| 5,992,594 A | 11/1999 | Herrle et al. |
| 6,021,747 A | 2/2000 | Gee et al. |
| 6,032,775 A | 3/2000 | Martin |
| 6,085,881 A | 7/2000 | Robb |
| 6,419,064 B1 | 7/2002 | Krammer |
| 6,443,283 B1 | 9/2002 | Augenstein et al. |
| 6,481,390 B1 | 11/2002 | Robb |
| 6,695,113 B2 | 2/2004 | Lutz |
| 6,752,251 B2 | 6/2004 | May et al. |
| 6,935,478 B2 | 8/2005 | Dräger et al. |
| 7,083,032 B2 | 8/2006 | Boyer |
| 7,191,883 B2 | 3/2007 | Angermaier |
| 7,278,524 B2 | 10/2007 | Boyer |
| 7,854,307 B2 | 12/2010 | Hennessy et al. |
| 7,886,886 B2 | 2/2011 | Schultheiss et al. |
| 7,913,825 B2 | 3/2011 | Boyer |
| 7,913,826 B2 | 3/2011 | Boyer |
| 7,938,240 B2 | 5/2011 | Hennessy et al. |
| 7,946,400 B2 | 5/2011 | Hennessy et al. |
| 7,980,373 B2 | 7/2011 | Boyer |
| 8,100,241 B2 | 1/2012 | Hennessy et al. |
| 8,186,494 B2 | 5/2012 | Boyer |
| 8,596,438 B2 | 12/2013 | Boyer |
| 8,616,357 B2 | 12/2013 | Boyer |
| 8,881,881 B2 | 11/2014 | Gevers et al. |
| 8,887,888 B2 | 11/2014 | Hennessy et al. |
| 9,239,086 B2 | 1/2016 | Kubota et al. |
| 9,316,272 B1 | 4/2016 | Gwin |
| 9,328,781 B2 | 5/2016 | Kubota et al. |
| 9,587,683 B2 | 3/2017 | Gwin |
| 9,845,833 B2 | 12/2017 | Skaggs et al. |
| 2015/0300424 A1 | 10/2015 | Ueda et al. |
| 2016/0108973 A1 | 4/2016 | Gwin |
| 2016/0169235 A1 | 6/2016 | Ignatovich |
| 2017/0077784 A1 | 3/2017 | Bahr et al. |
| 2018/0291969 A1 | 10/2018 | Stagg et al. |
| 2018/0355925 A1 | 12/2018 | Hennessy et al. |

FOREIGN PATENT DOCUMENTS

| | | |
|---|---|---|
| EP | 0481584 A1 | 4/1992 |
| GB | 871131 A | 6/1961 |
| GB | 2185555 B | 5/1990 |
| JP | S57-179431 A | 11/1982 |
| JP | H04-194423 A | 7/1992 |
| JP | H11-270593 A | 10/1999 |
| KR | 10-0639695 B1 | 10/2006 |
| WO | 2001002701 A1 | 1/2001 |
| WO | 2001014759 A1 | 3/2001 |
| WO | 2004051107 A2 | 6/2004 |
| WO | 2007016314 A1 | 2/2007 |
| WO | 2007016493 A1 | 2/2007 |
| WO | 2007016494 A1 | 2/2007 |
| WO | 2007016497 A1 | 2/2007 |
| WO | 2014047430 A1 | 3/2014 |
| WO | 2014158397 A1 | 10/2014 |
| WO | 2014159374 A1 | 10/2014 |
| WO | 2017062328 A1 | 4/2017 |
| WO | 2017062330 A1 | 4/2017 |
| WO | 2018004833 A1 | 1/2018 |
| WO | 2018057276 A2 | 3/2018 |
| WO | 2018144428 A1 | 8/2018 |

\* cited by examiner

PUMP AND WIPER ASSEMBLY, ASSOCIATED VISCOUS CLUTCH AND ASSOCIATED METHOD

CROSS-REFERENCE TO RELATED APPLICATION(S)

The present application is a Section 371 National Stage Application of International Application No. PCT/US2019/067119, filed Dec. 18, 2019 and published as WO 2020/159637 A1 on Aug. 6, 2020, in English, and further claims priority to U.S. provisional patent app. Ser. No. 62/799,232, filed Jan. 31, 2019.

FIELD

Embodiments of the present invention generally relate to pump and wiper assemblies for viscous clutches, viscous clutches including such pump and wiper assemblies, rotor assemblies for viscous clutches including such pump and wiper assemblies, and associated methods.

BACKGROUND

Variable speed clutches are used in a variety of applications for controlling an output speed of rotating equipment. For example, viscous (or fluid friction) clutches have been successfully deployed in automotive applications to drive cooling fans and pumps, among other uses. Viscous clutches typically employ relatively thick silicone oil (more generally called shear fluid or viscous fluid) for the selective transmission of torque between two rotatable components. Engagement or disengagement the clutch is made possible by selectively allowing the shear fluid into and out of a working chamber (or shear area) of the clutch located between input and output members (e.g., between a rotor and a housing) where a viscous shear coupling can be created by the shear fluid to transmit torque from the input member to the output member. A valve is used to control the flow of the shear fluid into and/or out of the working chamber. Some recent clutch designs allow the shear fluid to be stored in a reservoir (or storage chamber) attached to an input member of the clutch while the clutch is disengaged/off, in order to keep kinetic energy available in the shear fluid to allow relatively rapid engagement of the output member from the disengaged/off condition. Viscous clutches also typically include a pumping device that takes advantage of relative motion between the input and output members, or the "slip" between them, in order to provide a passive pumping action to move the shear fluid from the working chamber to the reservoir. An example viscous clutch pumping device is disclosed in commonly-assigned PCT International Patent Application Pub. No. WO2014/047430A1.

Viscous clutches are desirable because they are able to control an output torque over a wide speed range. They are also desirable due to the use of a shear fluid as the torque transfer means. The shear fluid has a long service and life and is generally maintenance-free.

However, known viscous clutches face a number of difficulties in their design and operation. For instance, one problem experienced with the use of viscous clutches is so-called "morning sickness" (also referred to by other terms such as "fan boom", "attendant rotation", "taking around", etc.). When clutches are at rest when a motor is powered off (e.g., when installed on a vehicle that has been unused overnight), shear fluid can migrate from the reservoir to the working chamber. The degree of fluid migration to the working chamber often varies depending upon a rotational orientation of the clutch when at rest. In some rotational orientations, bores or other passageways within the clutch are at or near a lower portion of the clutch where gravity can urge significant amounts of the shear fluid through those bores or other passageways and into the working chamber. Upon startup of the motor, rotational input to the clutch can produce a significant degree of undesired engagement of the clutch output, due to the presence of migrated shear fluid in the working chamber. Such undesired clutch output engagement due to "morning sickness" can, for instance, produce a relatively high fan speed output (in fan clutch applications) with undesired fan noise, parasitic power losses, and excessive engine cooling. Although shear fluid in the working chamber due to "morning sickness" is generally pumped out of the working chamber to the reservoir quickly following a period of operation, it is desired to reduce this effect or substantially avoid the "morning sickness" phenomenon entirely.

Furthermore, the response time to change a degree of viscous clutch engagement between essentially 0% to 100% engagement (and an associated range of slip speeds), can suffer from undesired lags and hysteresis effects. In other words, it may be desired to increase or decrease the output speed of the clutch but there is some delay when effectuating such a desired change in clutch output speed, generally due to the presence of significant volumes of the shear fluid in certain areas of the viscous clutch and the time needed to transfer the shear fluid to a different location. Longer response times to decrease clutch engagement (or to fully disengage the clutch) may occur when shear fluid is present or remains in the working chamber, thereby undesirably prolonging engagement or producing higher-than-intended engagement for a period of time. Longer response times to increase clutch engagement (or to engage the clutch from a disengaged/off condition) may occur when shear fluid remains in the reservoir or takes considerable time to reach the working chamber. Such delays undesirably prolong viscous clutch response times.

The primary purpose of a fan clutch is to disconnect the fan from a powertrain providing torque when the fan is not required to be in operation. Long clutch dis-engagement times result in the fan needlessly using power.

Viscous clutches with active pumping mechanisms are known. These clutches include a motorized pump to move shear fluid within the clutch, or into and out of the clutch. However, such active pumps are complex, requiring a dedicated control system. Such active pumps also require the presence of pumps and motors that take up space and add mass, each of which is undesirable for many applications, such as in automotive applications, where compact and relative low mass assemblies are beneficial. Moreover, active pumping systems have many moving parts that are subject to wear and failure. For these reasons, active pumping systems are generally disfavored for viscous clutches, unlike actively controllable valve systems that are common to all state-of-the-art viscous clutches.

Somewhat similarly, viscous clutches with active or otherwise movable wiper or dam structures are known. These active structures include a wiper or dam element that physically moves relative to the clutch component on which it is mounted, typically by protruding either more or less into the working chamber, in order to pump more or less of the shear fluid under certain operational conditions. However, such moving dams add complexity and potential failure points. Indeed, many such systems rely on a movable element that must contact another component operating at a different rotational speed, thereby causing a physical contact point that produces wear and friction, which adds heat and drag and also represents a parasitic loss that does not contribute to torque transmission by the clutch. Still further, such moveable elements may behave somewhat unpredictably during clutch operation, for instance, when utilized in a vehicle subject to vibrations and unpredictable jolts cause by obstacles in the vehicle's path that may interfere with intended positioning of the movable element. Moreover, such active/movable wiper or dam elements can undesirably increase the number of steps needed to fabricate the clutch.

It is therefore desired to provide an alternative pump and wiper assembly for a viscous clutch in order to help improve clutch responsiveness across a range of different operating conditions, without negatively impacting an ability to retain shear fluid in the reservoir during shutdown conditions.

SUMMARY

In one aspect, a viscous clutch includes an input member rotatable about an axis of rotation, an output member selectively rotatable about the axis of rotation, a working chamber bounded by the input member and the output member such that torque can be selectively transmitted between the input member and the output member through fluid frictional forces based upon a volume of a shear fluid present in the working chamber, a reservoir defining an interior volume capable of holding a supply of the shear fluid, an arc-shaped wall positioned within the reservoir, a release bore that fluidically connects the reservoir to the working chamber, and a pump and wiper assembly positioned along the working chamber that includes a leading pump and wiper sub-assembly and a trailing pump and wiper sub-assembly. The arc-shaped wall defines a first portion of the reservoir having a closed end and an open end, and the arc-shaped wall extends circumferentially between the open and closed ends over a wall arc segment. The leading pump and wiper sub-assembly includes a leading wiper and a leading pump bore, with the leading pump bore fluidically connecting the working chamber to the reservoir, and with the leading pump bore located adjacent to the leading wiper. The trailing pump and wiper sub-assembly includes a trailing wiper and a trailing pump bore, with the trailing pump bore fluidically connecting the working chamber to the reservoir, with the trailing pump bore located adjacent to the trailing wiper, and with the trailing pump and wiper sub-assembly located downstream from the leading pump and wiper sub-assembly. The release bore, the leading pump bore, and the trailing pump bore are all directly fluidically connected to the first portion of the reservoir within a bore arc segment that is circumferentially smaller than the wall arc segment of the arc-shaped wall. One or more intermediate pump and wiper assemblies can additionally be provided if desired.

In another aspect, a method of using a viscous clutch that includes a working chamber and a reservoir is provided, where an output slip speed of the viscous clutch is controllable by varying a volume of a shear fluid present in the working chamber. The method includes partially shielding a first portion of the reservoir from a remaining portion of the reservoir with a wall, selectively controlling shear fluid flow from the reservoir to the working chamber through a release bore that is directly fluidically connected to the first portion of the reservoir, pumping shear fluid from the working chamber to the reservoir with a leading wiper and a leading pump bore associated with the leading wiper, and pumping shear fluid from the working chamber to the reservoir with a trailing wiper and a trailing pump bore associated with the trailing wiper. The leading pump bore directly fluidically connects to the first portion of the reservoir, and the trailing pump bore directly fluidically connects to the first portion of the reservoir.

In another aspect, a viscous clutch includes an input member rotatable about an axis of rotation, an output member selectively rotatable about the axis of rotation, a working chamber bounded by the input member and the output member such that torque can be selectively transmitted between the input member and the output member through fluid frictional forces based upon a volume of a shear fluid present in the working chamber, a reservoir defining an interior volume capable of holding a supply of the shear fluid, a release bore that fluidically connects the reservoir to the working chamber, a leading wiper that extends into the working chamber, a leading pump bore positioned adjacent to the leading wiper that fluidically connects the working chamber to the reservoir, a trailing wiper that extends into the working chamber and has a width that is greater than a width of the leading wiper in an axial direction, and a trailing pump bore positioned adjacent to the trailing wiper and downstream of the leading pump bore that fluidically connects the working chamber to the reservoir.

In another aspect, a rotor assembly for a viscous clutch includes a rotor disk having an outer diameter surface, a reservoir carried with the rotor disk with the reservoir located radially inward from the outer diameter surface of the rotor disk, a leading wiper that radially protrudes from the outer diameter surface of the rotor disk, a leading pump bore positioned adjacent to the leading wiper that extends from the outer diameter surface of the rotor disk to the reservoir, a trailing wiper that radially protrudes from the outer diameter surface of the rotor disk, and a trailing pump bore positioned adjacent to the trailing wiper and downstream of the leading pump bore that extends from the outer diameter surface of the rotor disk to the reservoir. The trailing wiper has a width that is greater than a width of the leading wiper in an axial direction.

In yet another aspect, a method of using a viscous clutch is provided. The viscous clutch includes a working chamber, a reservoir, and a rotor disk, and an output slip speed of the viscous clutch is controllable by varying a volume of a shear fluid present in the working chamber. The method includes delivering shear fluid from the reservoir to the working chamber through a release bore that is directly fluidically connected to the first portion of the reservoir, pumping shear fluid from the working chamber to the reservoir with a leading wiper and a leading pump bore associated with the leading wiper, passing a volume of the shear fluid by the leading wiper in a circumferential direction at a location radially outward from the rotor disk, and pumping shear fluid from the working chamber to the reservoir with a trailing wiper and a trailing pump bore associated with the trailing wiper. At least a portion of the volume of the shear fluid that passed by the leading wiper enters the trailing pump bore.

The present summary is provided only by way of example, and not limitation. Other aspects of the present invention will be appreciated in view of the entirety of the present disclosure, including the entire text, claims and accompanying figures.

Figure 1:
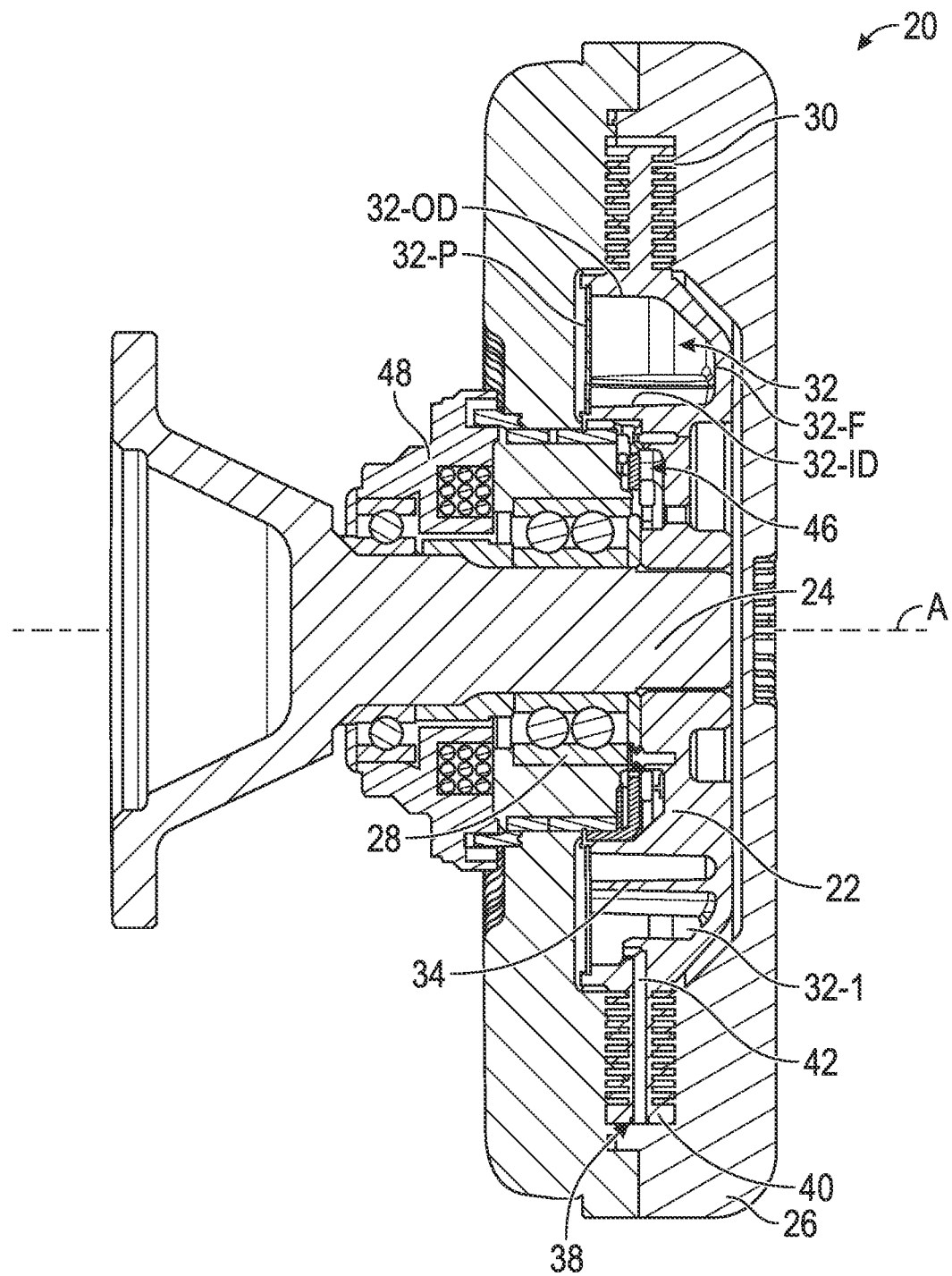
FIG. 1 is a cross sectional view of an embodiment of a viscous clutch.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

DETAILED DESCRIPTION OF ILLUSTRATIVE EMBODIMENTS

In general, embodiments of the present invention provide a pump and wiper assembly, and a viscous clutch incorporating such a pump and wiper assembly, that facilitates improved viscous clutch response times across different clutch input speeds and different degrees of viscous clutch engagement. Associated methods of making and using a pump and wiper assembly, and a viscous clutch incorporating such a pump and wiper assembly, are also disclosed. In some embodiments, a multi-pump and wiper configuration is provided, with a series of individual pump and wiper sub-assemblies that can pump fluid concurrently during unidirectional operation. The individual pump and wiper sub-assemblies can have different configurations in some embodiments, such as different sizes and shapes for upstream and downstream sub-assemblies. Embodiments of the invention can provide different levels of pumping during unidirectional operation that beneficially produce different pumping efficiencies under different clutch engagement conditions, without significantly limiting an ability to trap shear fluid within a reservoir of the clutch at shut down. In other words, a rate of pumping can vary non-linearly with respect to the degree of clutch engagement without interfering with reservoir fluid retention features. For example, embodiments of the invention provide more effective pumping in a condition of a small speed differential between a clutch input and output and provide less effective pumping in a condition of a large speed differential between the clutch input and output. Embodiments of the present invention further permit the use of anti-drainback features to limit flow of shear fluid from the reservoir to a working chamber causing undesired engagement at startup known as "morning sickness", and disclosed embodiments of the pump and wiper assembly do not interfere with such anti-drainback features. For example, in embodiments having an anti-drainback wall inside the reservoir that circumferentially extends over a wall arc segment, all of the bores of the pump and wiper assembly as well as all release bores can have exits or entrances that directly fluidically connect to the reservoir within a bore arc segment that is smaller than the arc segment of the anti-drainback wall, and which can be circumferentially spaced from a free end of such an anti-drainback wall. Embodiments of the invention further permit essentially passive shear fluid return pumping to be achieved, without the need for active controls or complex movable mechanisms that may be prone to wear, failure, or malfunction. That is, wipers and pump bores can be fixed and/or non-movable relative to an input or output member on which they are located during clutch operation. Numerous other features and benefits will be appreciated by those of ordinary skill in the art in view of the entirety of the present disclosure, including the accompanying figures.

Figure 2:
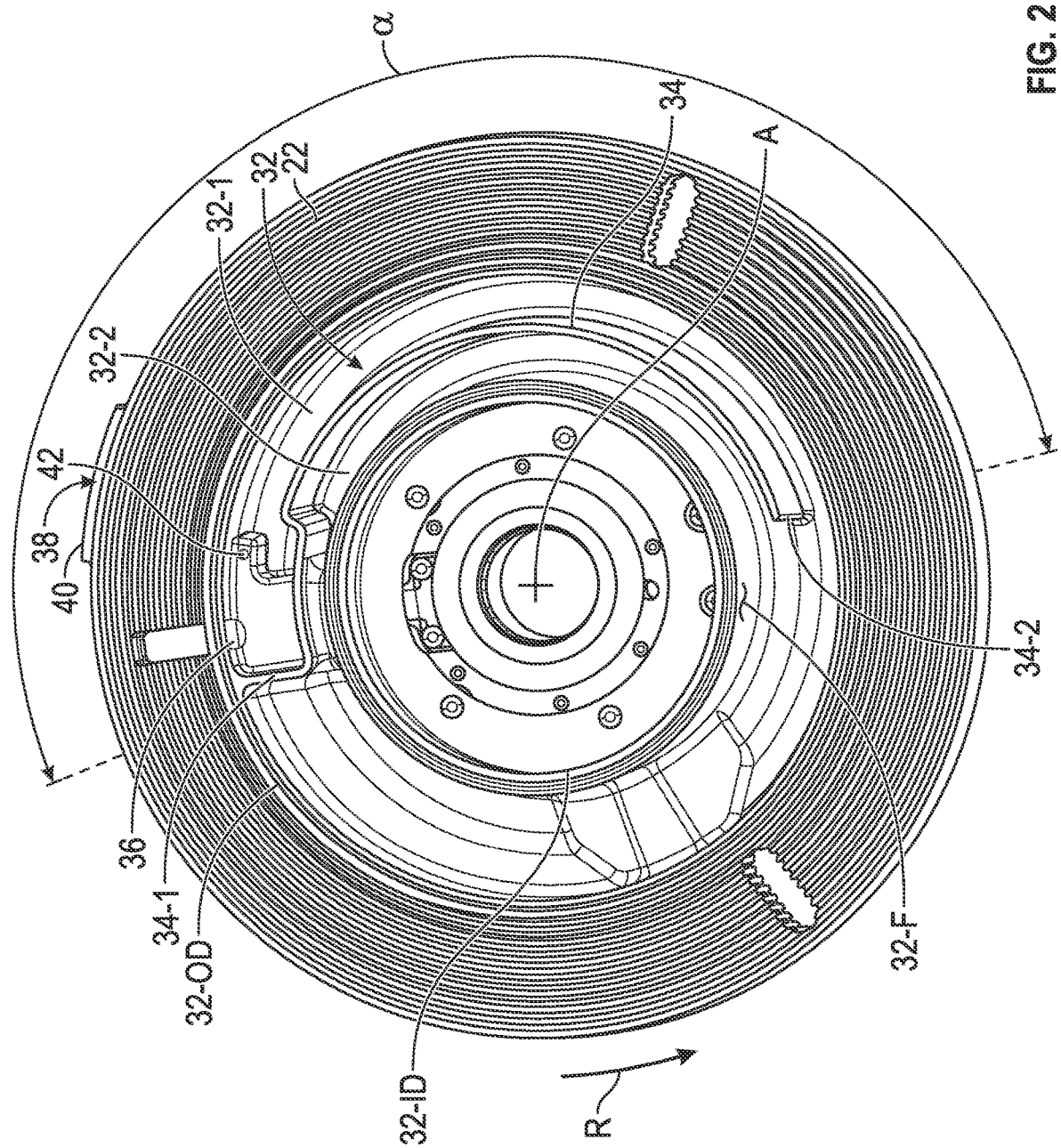
FIG. 2 is a rear perspective view of a rotor, a reservoir, and a pump and wiper assembly of the viscous clutch of FIG. 1, shown in isolation.
Figure 3:
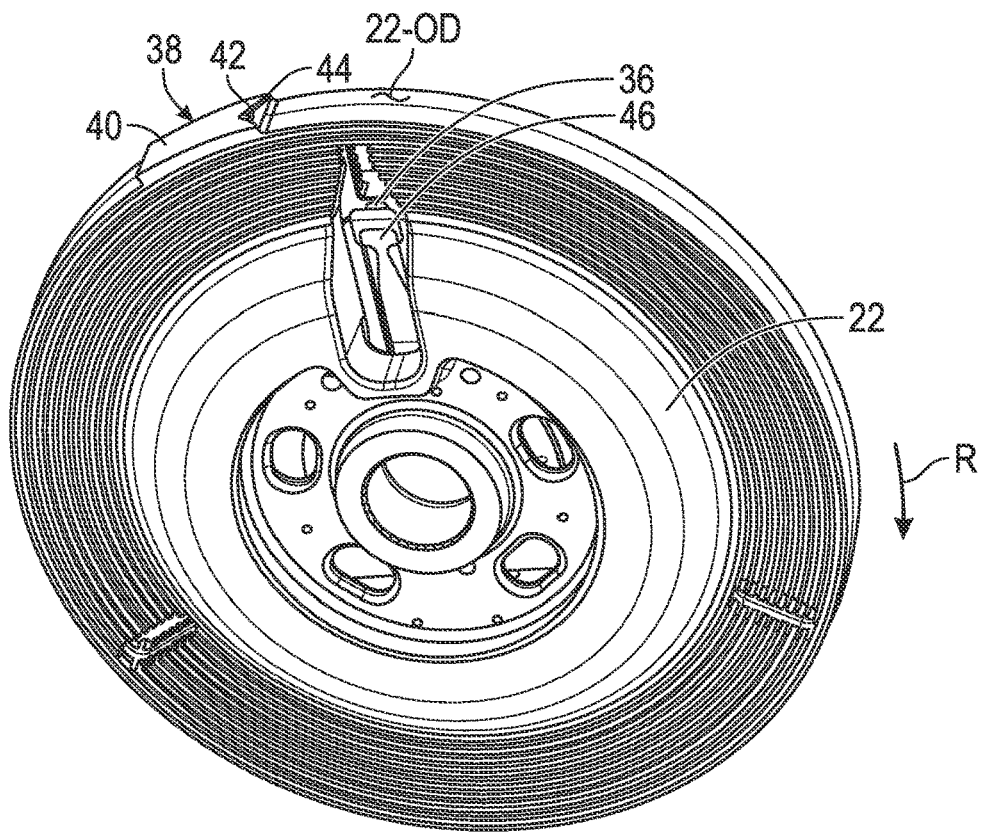
FIG. 3 is a front perspective view of the rotor of FIGS. 1 and 2 in which a portion of a valve is shown.
Figure 4:
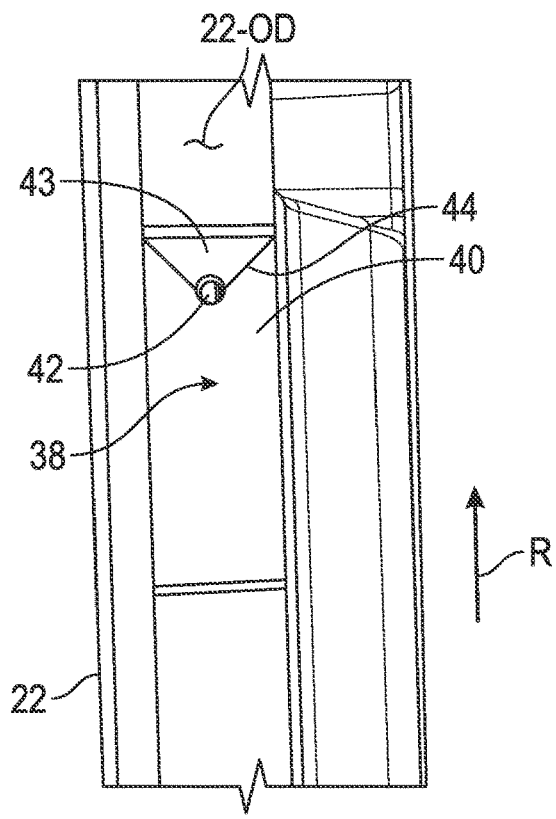
FIG. 4 is a plan view of a portion of the rotor and the pump and wiper assembly of FIGS. 1-3.

FIG. 1 is a cross-sectional view of an embodiment of a viscous clutch (or drive) 20, and FIGS. 2-4 are various isolated views of an embodiment of certain components of the viscous clutch 20 of FIG. 1. In the illustrated embodiment, a rotor 22 is attached and rotationally fixed to a "live" input shaft 24 that accepts a torque input to the clutch 20, such that the rotor 22 rotates whenever there is a torque input to the input shaft 24. The input shaft 24 defines an axis of rotation A of the clutch 20. The input shaft 24 can be connected to a driveshaft, a sheave or pulley, or the like (not shown) in order to receive torque input from a prime mover (for example, from an internal combustion engine). The rotor 22 is configured as a rotor disk in the illustrated embodiment. A housing 26 is positioned adjacent to and surrounds the rotor 22, with the housing 26 being selectively rotatable at a given slip speed relative to the rotor 22 as a function of the degree of fluid friction engagement of the clutch 20. As shown, the housing 26 has a multi-part construction, including a base and a cover portion secured to the base, with the housing 26 (for instance, the base of the housing 26) rotatably supported on the input shaft 24 with bearings 28. A working chamber (or shear area) 30 is defined by and between the rotor 22 and the housing 26, allowing a shear fluid (e.g., silicone oil) in the working chamber 30 to be in frictional contact with both the rotor 22 and the housing 26 in order to transmit torque through a viscous shear coupling. Interspersed ribs and grooves can be provided on the rotor 22 and the housing 26 in order to increase a total surface area available for frictional contact with the shear fluid present in the working chamber 30. Moreover, axially-extending openings can be provided through the rotor 22 to allow for movement of the shear fluid present in the working chamber 30 between opposite front and rear sides of the rotor 22. A degree of engagement of the clutch 20, and accordingly a slip speed of the output of the clutch 20, can be controlled by regulating a volumetric amount of the shear fluid present in the working chamber 30. In that way, rotational speed of the housing 26 can be selectively controlled during operation of the clutch 20. An output device (not shown), such as a fan, a sheave (or pulley), sprocket, or the like, can be attached to the housing 26 to accept the torque output of the clutch 20.

Carried by the rotor 22 is a reservoir 32 for holding a supply of the shear fluid when not in use. In the illustrated embodiment, the reservoir 32 is located generally radially inward from the working chamber 30. Moreover, in the illustrated embodiment the reservoir 32 defines an internal storage volume with a boundary that is partly formed by structures integrally and monolithically formed (for instance, cast) with the rotor 22 together with a reservoir plate 32-P that is a separate structure attached to the rotor 22 (the reservoir plate 32-P is omitted in FIG. 2 to reveal the interior storage volume of the reservoir 32). For instance, as shown in FIG. 1, an inner diameter boundary 32-ID, an outer diameter boundary 32-OD, and an axially forward boundary 32-F of the reservoir 32 are provided by walls or webs of material that are integral with the rotor 22 while an axially rear boundary of the reservoir 32 is provided by the reservoir plate 32-P. The reservoir 32 is rotationally fixed relative to the rotor 22, such that the reservoir 32 rotates whenever there is a torque input to the clutch 20. Having the reservoir 32 carried on an input portion of the clutch 20 imparts kinetic energy to the shear fluid stored in the reservoir 32 whenever there is a torque input to the clutch 20, which facilitates relatively quick responses times to increase the degree of clutch engagement by utilizing the available kinetic energy to help move the shear fluid from the reservoir 32 to the working chamber 30 relatively quickly. In alternate embodiments, the reservoir 32 can be a separate structure attached to the input shaft 24 or the rotor 22, such that the reservoir 32 has a boundary that is structurally distinct from the rotor 22 but still rotates with the torque input to the clutch 20. In still further embodiments, the reservoir 32 can be carried by or integrated into the housing 26, such as in alternate embodiments where the housing 26 functions as a clutch input and the rotor 22 functions as a clutch output.

The reservoir 32 can further contain an arc shaped wall 34 that acts as an anti-drainback fluid retention feature and helps to prevent a portion of the shear fluid contained in the reservoir 32 from draining out (and migrating into the working chamber 30) during clutch shut down conditions, thereby reducing the problem of so-called "morning sickness" and helping the clutch 20 to disengage relatively quickly at start up. In the illustrated embodiment, the arc-shaped wall 34 extends axially across the entire reservoir 32 from the front boundary 23-F to the rear boundary formed by the reservoir plate 32-P, and extends circumferentially along an arc segment α of approximately 180°. In some embodiments the arc-shaped wall 34 can extend circumferentially over an arc segment a' of less than 180°, such as 150°, 120°, 90°, 60°, 45°, or 30°. Moreover, the arc-shaped wall 34 is positioned in a radially middle portion the interior storage volume of the reservoir 32, in between inner and outer diameter boundaries 32-ID and 32-OD, with an end portion wall 34-1 that extends substantially radially to the outer diameter boundary 32-OD. The arc-shaped wall 34 has a free end 34-2 opposite the end portion wall 34-1. The end portion wall 34-a can form essentially a closed end at the arc-shaped wall 34, and the free end 34-2 can form essentially an open end at the arc-shaped wall 34 opposite the closed end, as will be explained further below. Further, in the illustrated embodiment the arc-shaped wall 34 has a jog or step near the end portion wall 34-1, and in alternate embodiments can have other shapes. Other types of anti-drainback and/or fluid capture features can be provided in the reservoir 32 in alternative embodiments, such as one or more walls for an embodiment of a fluid capture system disclosed in commonly-assigned PCT International Pat. App. Pub. No. WO2017/096202A1.

Also provided in the clutch 20 are a release (or outlet) bore 36 (not visible in FIG. 1) for dispensing the shear fluid from the reservoir 32 to the working chamber 30 and a pump and wiper assembly 38 that includes at least one wiper (also referred to as a baffle or dam) 40 and at least one pump bore (also called a return or scavenge bore) 42 for pumping the shear fluid from the working chamber 30 back to the reservoir 32. The release bore 36 and the pump bore(s) 42 form a fluid circuit that links the working chamber 30 and the reservoir 32. The pump and wiper assembly 38 is carried with the rotor 22 in the illustrated embodiment, at a generally outer diameter portion of the rotor 22. During operation of the clutch 20, relative motion between the rotor 22 and the housing 26 that function as input and output members, or the "slip" between them, causes the pump and wiper assembly 38 to provide an essentially passive pumping action to move the shear fluid from the working chamber 30 to the reservoir 32 though the pump bore(s) 42. In general, as the at least one wiper 40 of the pump and wiper assembly 38 encounters shear fluid present in the working chamber 30, that shear fluid is locally pressurized and thereby forced into and through the at least one corresponding pump bore 42. Such a pumping action allows the shear fluid to be pumped from the working chamber 30 to the reservoir against centrifugal, frictional, and/or other forces acting upon the shear fluid. However, aside from the relative movement or "slip" between the rotor 22 and the housing 26 (or other input and output members that may carry the pump and wiper assembly 38), the pump and wiper assembly 38 has no moving parts and thereby operates passively. In this way, the shear fluid is essentially continuously pumped from the working chamber 30 back to the reservoir 32 when the clutch 20 is in use, though as explained further below the rate of pumping may vary over a range of operational conditions.

The arc-shaped wall 34 and its end portion wall 34-1 form a partial shield within the reservoir 32 relative to the bores 36 and 42. That is to say that the arc-shaped wall 34 is positioned adjacent to the bores 36 and 42 that link the reservoir 32 to the working chamber 30 along the fluid circuit, and thereby separates a first portion 32-1 of the reservoir 32 that is directly fluidically connected to the bores 36 and 42 from a remaining portion 32-2 of the reservoir 32. The first portion 32-1 of the reservoir 32 can have an arc shape, that is, can be configured as an annular segment that has an angle that the arc subtends of less than 360°, while the remaining portion 32-2 of the reservoir 32 can have a shape that is annular, circular, of the like. Moreover, the first portion 32-1 of the reservoir 32 formed by the arc-shaped wall 34 can have a closed end at the end portion wall 34-1 and an open end at the free end 34-2, such that fluid flow into or out of the reservoir 32 via the bores 36 and 42 is controlled, metered, and/or partially shielded by the arc shaped wall 34. In the illustrated embodiment the first portion 32-1 of the reservoir 32 is located at a radially outward side of the reservoir 32, and generally at a radially outward side of the arc-shaped wall 34. In some embodiments, at least part of the remaining portion 32-2 of the reservoir 32 extends entirely about the axis of rotation A, that is, allows stored shear fluid contained in that remaining portion 32-2 to flow a full 360° about the axis of rotation A within the reservoir 32.

In the embodiment shown in FIGS. 2-4, there is a single wiper 40 located at or adjacent to a single pump bore 42, and an entrance to the pump bore 42 is located at least partially within a recess 44 in the wiper. In the illustrated embodiment, the wiper 40 protrudes radially outward from an outer diameter surface 22-OD of the rotor 22, with a generally rectangular perimeter (curved to match the curvature of the rotor 22) having a width equal to a width of the outer diameter surface 22-OD of the rotor 22, and with the entrance to the pump bore 42 facing radially outward. As shown, the recess 44 is triangularly-shaped, formed by two planar boundary segments that each extend (e.g., tangentially) to a generally circular entrance opening to the pump bore 42, though alternative configurations are possible in further embodiments. The recess 44 has a shallower depth than the wiper 40 in the illustrated embodiment, that is, a protruding step or platform 43 is formed by the recess 44 in the radial direction. The recess 44 and platform 43 are located at an upstream side of the wiper 40, and directly adjoin the wiper 40. The recess 44 can have other configurations in further embodiments, such as having a curved shape at or adjacent to the entrance to the pump bore 42. The pump bore 42 extends radially and then axially through the generally outer diameter portion of the rotor 22, terminating at an exit from the pump bore 42 that faces axially and empties into the reservoir 32, though the shape and path of the pump bore 42 can vary as desired in further embodiments. The pump bore 42, or at least its exit, is positioned circumferentially in between the release bore 36 and the free end 34-2 of the arc-shaped wall 34, as well as circumferentially in between the end portion wall 34-1 and the free end 34-2 of the arc-shaped wall 34. At least the respective entrance and exits of the bores 36 and 42 are located in a circumferential bore arc segment θ relative to the axis of rotation A. Further, in the illustrated embodiment, the pump bore 42 is circumferentially spaced from the release bore 36 by approximately 15°, and the free end 34-2 of the arc-shaped wall 34 extends approximately 175° from the release bore 36 and approximately 160° from the pump bore 42 while the end portion wall 34-1 is located approximately 8-10° from the release bore 36 in the opposite circumferential direction.

A valve 46 (for example, an electromagnetically actuated valve) is also provided in the clutch 20 to regulate flow of the shear fluid between the reservoir 32 and the working chamber 30 along the fluid circuit. The clutch 20 can have a "fail safe" or "fail on" configuration, which means that the valve 46 is biased open by default (for instance, to allow fluid through the release bore 36 and out of the reservoir 32), and, for instance, when power is applied to an electromagnetic coil 48 the valve 46 is closed by covering the release bore 36 and the shear fluid is trapped (that is, retained) in the reservoir 32. In the case of a loss of power, or at shutdown, the valve 46 defaults to the open position. In further embodiments, one or more morning sickness prevention valves (not shown) can further be utilized to reduce or eliminate migration of the shear fluid out of the reservoir 32 during shutdown conditions, such as check valves and/or a valve disclosed in commonly-assigned PCT International Patent App. Pub. No. WO2017/062330A1. For instance, a morning sickness prevention valve or check valve can be used at any or all of the bores 36 and 42, in addition to the use of the valve 46 used for primary control of the operation of the clutch 20. In the illustrated embodiment, there is no valve associated with the pump bore 42, which is always open under all clutch operating conditions. Further, the release bore 36 and the pump bore 42 can be used for only one-way fluid flows during active clutch operation, such that the shear fluid passes through the release bore 36 only in a direction from the reservoir 32 to the working chamber 30 and such that the shear fluid passes through the return bore 42 only in a direction from the working chamber 30 to the reservoir 32.

In order to increase pumping capability of the viscous clutch 20, one or more additional and distinct pump and wiper assemblies can be added. In the prior art, the additional pump and wiper assemblies were identical and equally circumferentially spaced. In the case of two pump and wiper assemblies they would be placed 180° apart, and in the case of three they would be 120° apart. See, for instance, commonly-assigned U.S. Pat. No. 7,854,307 with two pump bores in an output housing spaced 180° apart. However, adding a second or third pump and wiper assembly in such an equally-spaced manner would place another hole (specifically another pump bore) outside of the wall arc segment α of the arc-shaped wall 34 within the reservoir 32, generally defeating the anti-drainback and anti-morning sickness functionality of that arc-shaped wall 34 by failing to shield the first portion 32-1 of the reservoir 32 that is directly fluidically connected to all of the bores 36 and 42 and failing to retain a significant portion of the shear fluid within the remaining portion 32-2 of the reservoir 32. In this respect, prior art viscous clutches with multiple pump and wiper assemblies fail to teach how to integrate an anti-drainback or morning sickness prevention wall within the reservoir, and would actually frustrate the operation of such anti-drainback or morning sickness prevention functionality.

As previously noted, the rate of pumping by a passive pump and wiper assembly generally varies over the operational conditions of a viscous clutch 20. The pressure that is built up at the entrance to the pump bore 42 by the wiper 40 is proportional to the relative velocity of the rotor 22 and the housing 26, that is, proportional to a speed differential between the input (e.g., rotor 22) and output (e.g., housing 26) of the clutch 20. When the clutch 20 is fully (100%) engaged, there is very little relative speed (that is, the speed differential is small), usually on the order of 5-10%, meaning the input is spinning 5-10% faster than the output. In the fully engaged condition, because of the low differential speed, the pump and wiper assembly 38 is slow to pump the shear fluid back to the reservoir 32 and dis-engagement can take quite a long time, resulting in relatively sluggish clutch response times. In this case, a second or third pump can speed the dis-engagement significantly. But too much pumping can be a problem when the clutch 20 is engaging, particularly when engaging from a fully disengaged condition. During this condition, the clutch 20 would be coming from a state of disengagement to engagement (or from a state of less engagement to more engagement). In order to increase clutch engagement, the valve 46 is opened and the shear fluid is allowed to move into the working chamber 30 of the clutch 20 from the reservoir 32. Shearing of the shear fluid in the working chamber creates fluid friction resulting in torque being transmitted between the input and the output (e.g., the rotor 22 and the housing 26). If the pumping action is too effective in this condition, that is the rate of pumping is too high, the shear fluid can be pumped back to the reservoir 32 from the working chamber 30 faster than the shear fluid flows out of the reservoir 32 to the working chamber 30, and the clutch 20 will fail to engage as intended—the actual engagement condition may be lower than desired, at least for some period of time. For these reasons it is desired to provide embodiments of a clutch that are able to provide a non-linear pumping rate in relation to a range of input/output speed differentials, but retaining the benefits of purely passive pump and wiper assemblies that avoid the drawbacks and disadvantages of active or movable pump devices.

Figure 5:
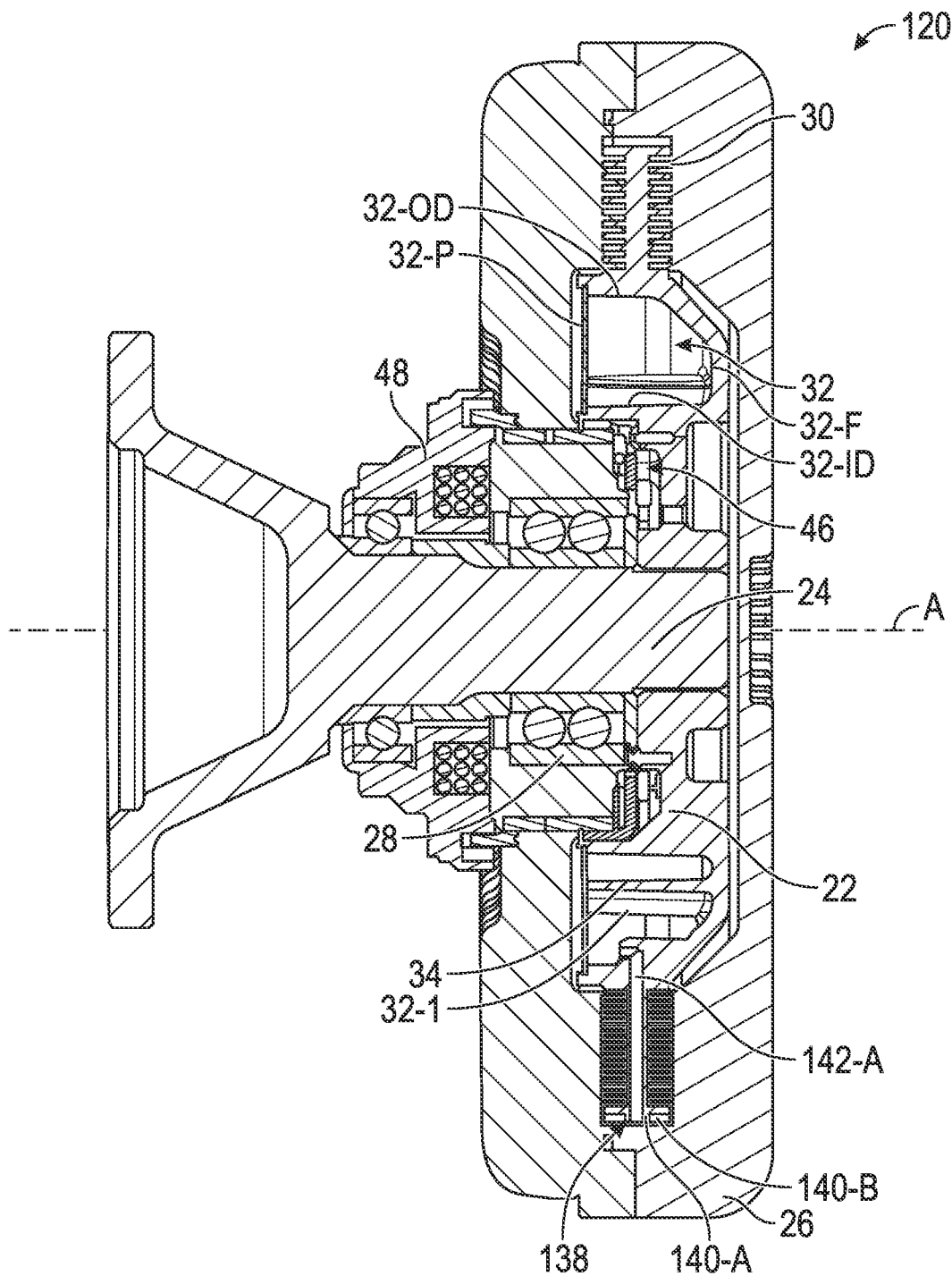
FIG. 5 is a cross sectional view of another embodiment of a viscous clutch.
Figure 6A:
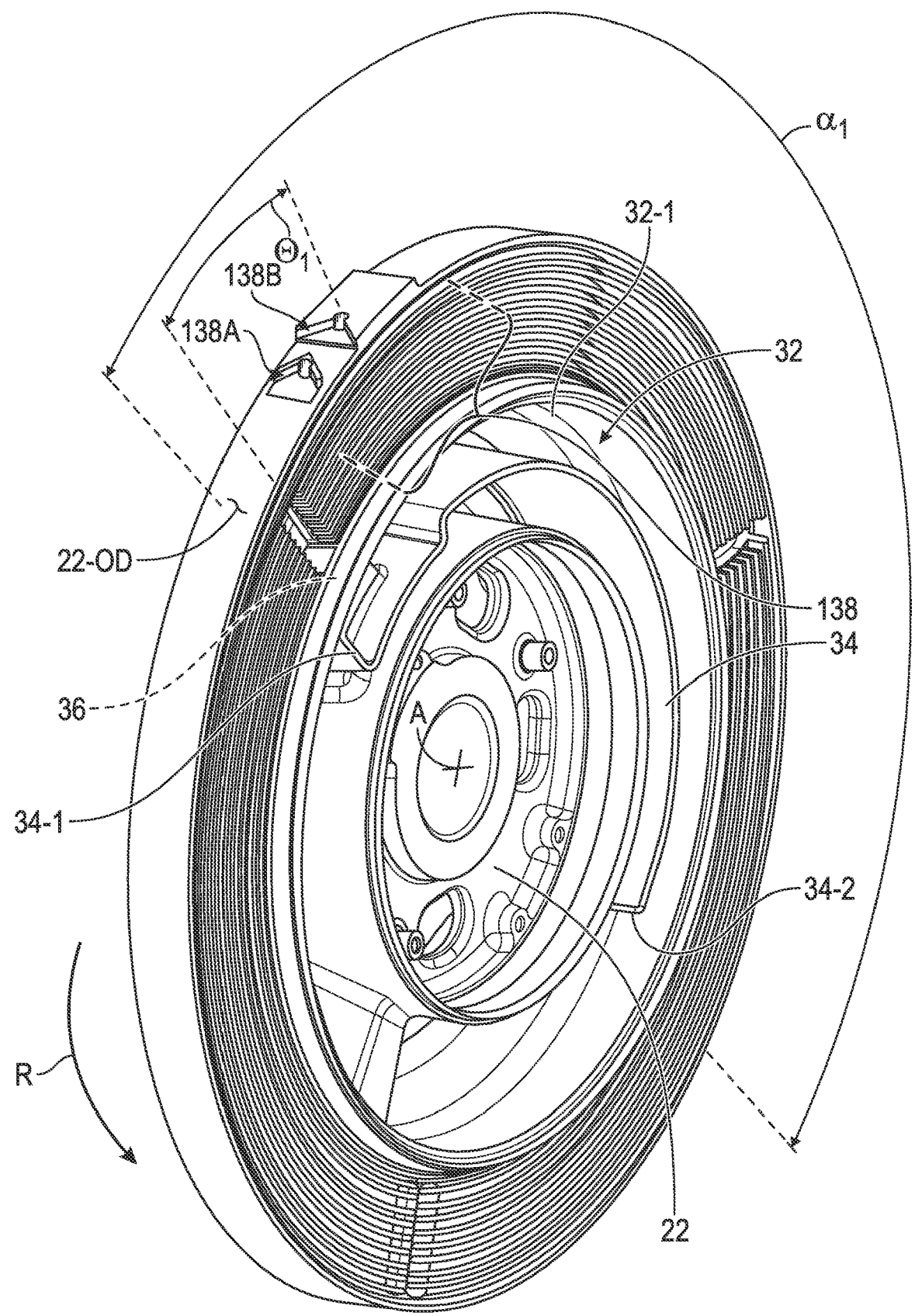
FIG. 6A is a rear perspective view of a rotor, a reservoir, and a pump and wiper assembly of the viscous clutch of FIG. 5, shown in isolation.
Figure 6B:
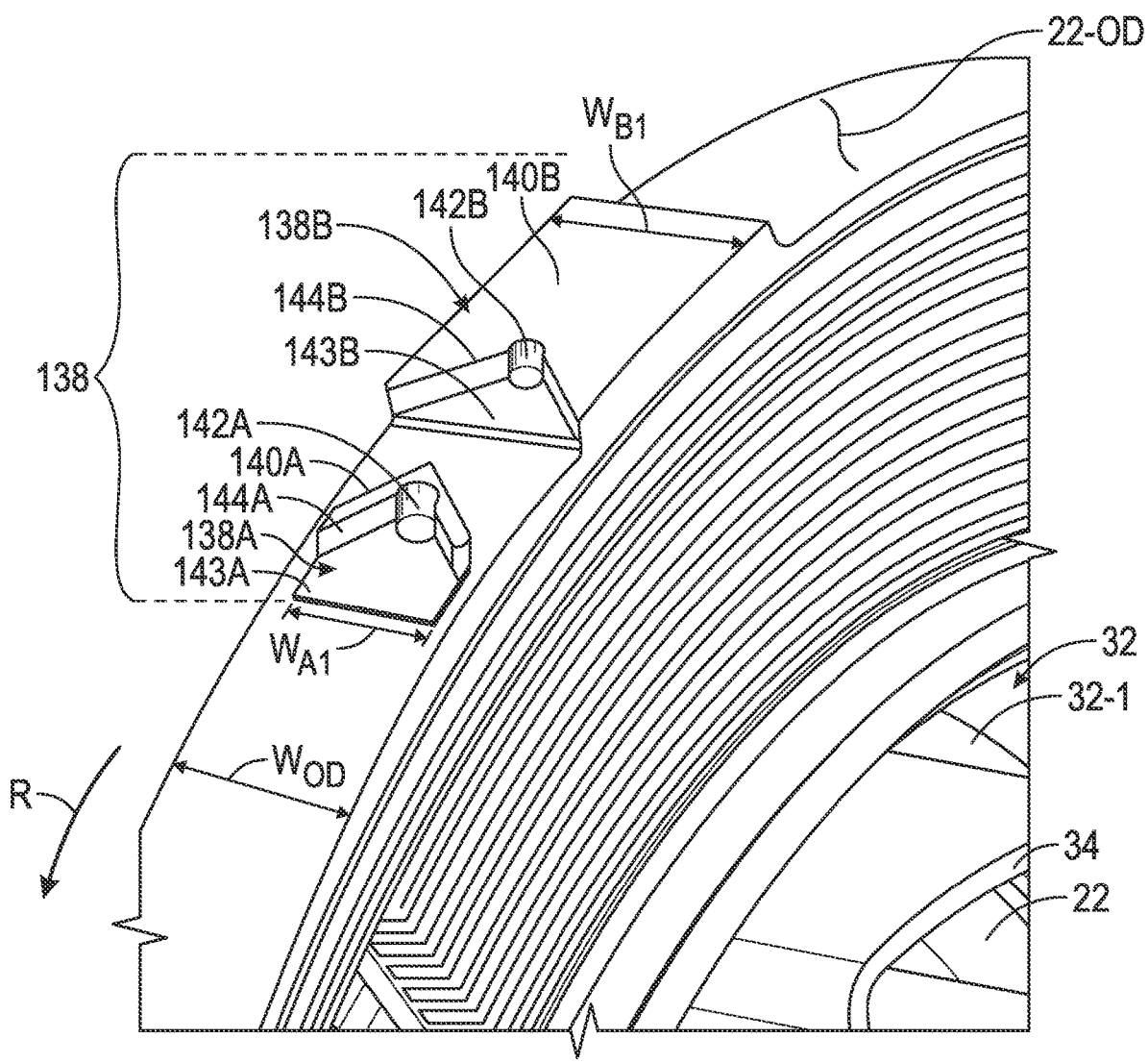
FIG. 6B is an enlarged view of a portion of the rotor and pump and wiper assembly of FIG. 6A.
Figure 7:
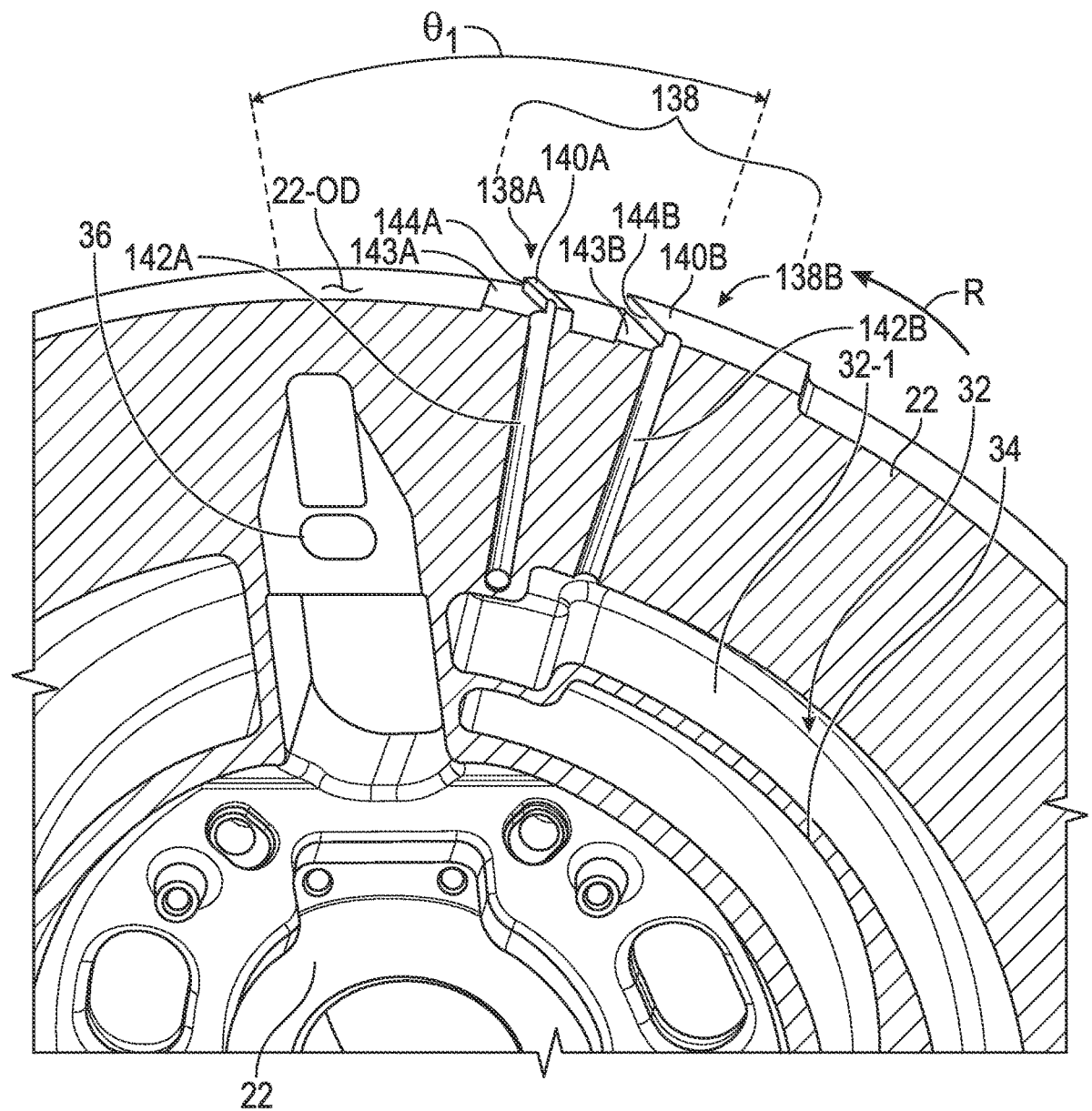
FIG. 7 is a sectional perspective view of the rotor and pump and wiper assembly of FIGS. 5, 6A, and 6B.

FIG. 5 is a cross-sectional view of another embodiment of the viscous clutch (or drive) 120, and FIGS. 6A, 6B, and 7 are various isolated views of certain components of the viscous clutch 120 of FIG. 5. More particularly, FIGS. 6A, 6B and 7 illustrate another embodiment of the rotor 22 of the clutch 120, with the rotor 22 having a pump and wiper assembly 138 that includes multiple wiper and pump bore sub-assemblies 138A and 138B that can concurrently pump the shear fluid through corresponding pump bores during a given clutch operational condition. Many components of the clutch 120 shown in FIG. 5 (for instance, the rotor 22, the input shaft 24, the housing 26, the working chamber 30, the reservoir 32, the arc-shaped wall 34, the release bore 36, and the valve 46) can be similar or identical to those described above with respect to the clutch 20 of FIG. 1 (and FIGS. 2-4), or in alternative embodiments can have other configurations as desired for particular applications.

As shown in the illustrated embodiment of FIGS. 5-7, there are two sub-assemblies 138A and 138B arranged in series relative to a circumference of the outer diameter surface 22-OD of the rotor 22. An initial or leading sub-assembly 138A is located upstream relative to a following or trailing subassembly 138B, which is located downstream relative to the sub-assembly 138A, and each of the sub-assemblies 138A and 138B can be arranged to operate to pump the shear fluid to the reservoir 32 when the clutch 120 has a torque input in the same rotational direction such that the shear fluid encounters all of the sub-assemblies 138A and 138B from the same circumferential side (in fluidic flow series for unidirectional operation). The pump and wiper assembly 138, including all of the sub-assemblies 138A and 138B, are located downstream from the release bore 36 in the circumferential direction. In the present usage, upstream refers to portions of the outer diameter of the rotor 22 that tend to encounter shear fluid at a given location within the working chamber 30 earlier, due to the rotation of the rotor 22 and shearing of the shear fluid. In the illustrated embodiment the rotor 22 as shown in FIGS. 6A, 6B, and 7 rotates counterclockwise during operation, represented by arrow R, such that the sub-assembly 138A is upstream relative to the subassembly 138B. Furthermore, in the illustrated embodiment, each sub-assembly 138A and 138B includes a wiper 140A or 140B that protrudes from the rotor 22 (for instance, radially outward from the outer diameter surface 22-OD of the rotor 22) and an associated pump bore 142A or 142B in fluid communication with the reservoir 32. In the illustrated embodiment the pump bores 142A and 142B are each located at an upstream side of the respective wipers 140A and 140B, that is, the pump bores 142A and 142B are each positioned to the same circumferential side of the corresponding wiper 140A and 140B. Additionally, each sub-assembly 138A and 138B can include a front platform 143A or 143B and a recess 144A or 144B in the corresponding wipers 140A or 140B. The pump bores 142A and 142B can each be located at or in the recess 144A or 144B in the respective wiper 140A or 140B, and the front platforms 143A and 143B can each extend upstream of the respective pump bore 142A or 142B and be positioned at least partially (or entirely) within the respective recess 144A or 144B. Alternatively, such as in embodiments in which the platforms 143A or 143B and/or the recesses 144A or 144B are omitted entirely, the pump bores 142A and/or 142B can have entrances located adjacent to and upstream from the respective wipers 140A and/or 140B. The front platforms 143A and 143B can radially protrude from the outer diameter surface 22-OD of the rotor 22 by a smaller amount than the wipers 140A and 140B, thus aiding in fluid pressurization to pump the shear fluid but still allowing fluid flow into the pump bores 142A and 142B. In the illustrated embodiment, the recesses 144A and 144B each have a generally triangular shape, like the recess 44 of the previously disclosed embodiment, and directly adjoin the respective wipers 140A and 140B at upstream sides of the wipers 140A and 140B. However, as discussed further below, the leading pump and wiper sub-assembly 138A can have a different configuration than the trailing pump and wiper sub-assembly 138B. During operation, pressure can be passively built up at the entrance to the pump bores 142A and 142B by the respective wipers 140A and 140B due to a speed differential between the input (e.g., rotor 22) and output (e.g., housing 26) of the clutch 120.

The initial or leading sub-assembly wiper 140A can have an axial width $W_{A1}$ that is less than an axial width $W_{OD}$ of the outer diameter surface 22-OD of the rotor 22 and/or less than an axial width $W_{B1}$ of the trailing wiper 140B, which allows some shear fluid to bypass the pump and wiper sub-assembly 138A and pass downstream to the trailing sub-assembly 138B to feed the trailing pump bore 142B. In some embodiments, the wiper 140A could additionally or alternatively have a smaller radial height above the outer diameter surface 22-OD than the trailing wiper 140B, though in the illustrated embodiment the wipers 140A and 140B have substantially the same radial heights. The smaller size of the wiper 140A means that the initial or leading wiper 140A does not fully occupy an associated local region of the working chamber 30 adjacent to the outer diameter surface 22-OD of the rotor 22, but rather, in section, a significant adjacent area of the working chamber 30 is unobstructed by the wiper 140A to allow some flow of the shear fluid present in the working chamber 30 to pass by (or bypass) the leading or initial sub-assembly 138A. At least a portion of the volume of the shear fluid that passed by the leading wiper 140A can then enter the trailing pump bore 142B.

The wiper 140A can have a chevron shape or "V" shape that complements the triangular shape of the recess 144A. In further embodiments, the wiper 140A can have a curved trailing edge shape and/or a curved recess 144A, or have other suitable shapes. The platform 143A can extend upstream from the recess 144A and the wiper 140A, for instance with a curved but generally rectangular perimeter. In the illustrated embodiment, the shape of the wiper 140A at its trailing or downstream edge is configured such that the trailing edge of the wiper 140A is circumferentially spaced from the wiper 140B by a smaller distance in an axially middle portion (near the pump bore 142A) than at axially forward and rear locations, which can help facilitate shear fluid flow to the downstream pump bore 142B. Furthermore, the wiper 140A of the leading sub-assembly 138A can have a trailing edge shape that complements the shape of the recess 144B of the trailing sub-assembly 138B.

The trailing sub-assembly wiper 140B can have a generally rectangular prism shape (curved to match the curvature of the outer diameter surface 22-OD) into which the recess 144B extends. The trailing wiper 140B has an axial width $W_{B1}$ that is greater than the axial width $W_{A1}$ of the leading wiper 140A, and in the illustrated embodiment is substantially equal to the axial width $W_{OD}$ of the outer diameter surface 22-OD of the rotor 22, which allows some shear fluid to bypass the pump and wiper sub-assembly 138A and pass downstream to the trailing sub-assembly 138B. In some embodiments, the trailing wiper 140B could additionally or alternatively have a greater radial height above the outer diameter surface 22-OD than the leading wiper 140A, though in the illustrated embodiment the wipers 140A and 140B have substantially the same radial heights. The trailing wiper 140B can be sized in order to essentially fully occupy an associated local region of the working chamber 30 adjacent to the outer diameter surface 22-OD of the rotor 22, such that all or nearly all of the shear fluid in the working chamber 30 outward of the outer diameter surface 22-OD that encounters the trailing pump and wiper sub-assembly 138B is pumped into the pump bore 142B. The platform 143B of the illustrated embodiment does not extend upstream from the recess 144B and the wiper 140B, but instead is contained within the recess 144B and has a leading edge aligned with the upstream-most parts of the wiper 140B.

As already noted, the wiper 140A of the initial sub-assembly 138A has width $W_{A1}$ that is narrower than the width $W_{OD}$ of the outer diameter surface 22-OD of the rotor 22 (and can also be narrower than the width $W_{B1}$ of the trailing subassembly wiper 140B). This configuration allows some of the shear fluid present in the working chamber 30 to flow past the initial sub-assembly wiper 140A (and pump bore 142A) and feed the pump bore 142B of the trailing sub-assembly 138B during operation of the clutch 120. Furthermore, the pump bores 142A and 142B of the sub-assemblies 138A and 138B can have different sizes. For instance, the leading pump bore 142A can be smaller (for example, 2.25 mm in diameter) than the trailing pump bore 142B (for example, 3 mm in diameter). As one non-limiting example, a diameter of the leading pump bore 142A can be 75% of a diameter of the trailing pump bore 142B. Such a configuration makes pumping by the initial sub-assembly 138A less effective than pumping by the trailing sub-assembly 138B, particularly at high differential speeds. In some embodiments, the diameters of the bores 142A and 142B can each be substantially constant between the respective entrances and exits, but in other embodiments can vary, in which case bore diameters can be compared at the narrowest respective diameters. The multiple pump and wiper sub-assemblies 138A and 138B create a situation where the overall pump and wiper assembly 138 is relatively more effective in the condition of a small speed differential between the rotor 22 and housing 26 (such as at or near full clutch engagement) and relatively less effective in the case of a large speed differential (such as at or near a disengaged/off condition). In this way, the pumping rate of the pump and wiper assembly 138 is not at a fixed proportion in relation to variable clutch input speeds. For example, a total rate of pumping from the working chamber 30 to the reservoir 32 by the pump and wiper assembly 138 is greater when a speed differential between the rotor 22 and the housing 26 (or more generally, between a clutch input and a clutch output) is relatively low, such as 10% or less, than when the speed differential between the clutch input and a clutch output is relatively high, such as greater than 50%.

Because the exits of the two pump bores 142A and 142B are, circumferentially, very close to one another (for example, circumferentially within approximately 45°, approximately 25°, approximately 15°, approximately 10°, approximately 5°, or less than 5° relative to the axis of rotation A of the clutch 120), there is essentially no impact regarding the trapping of shear fluid in the reservoir 32 with the arc-shaped wall 34 when the clutch 120 is shut down. The arc-shaped wall 34 extends significantly further in the circumferential direction that the spacing between the pump bores 140A and 140B. Moreover, in the illustrated embodiment, at least the respective entrance or exits of all of the bores 36, 140A and 140B that directly fluidically connect to the reservoir 32 circumferentially overlap with and are positioned within the wall arc segment a of the arc-shaped wall 34, with all of the bores 36, 140A, and 140B positioned to circumferentially overlap the arc-shaped wall 34 and be circumferentially between the end portion wall 34-1 (and the closed end of the first portion 32-1 of the reservoir 32) and the free end 34-2 (and the open end of the first portion 32-1 of the reservoir 32). All of the bores 36, 140A, and 140B collectively define a circumferential bore arc segment $\theta_1$ relative to the axis of rotation A, such that, at least in some embodiments, there are no bores connecting the reservoir 32 to the working chamber 30 outside of the bore arc segment $\theta_1$. In the illustrated embodiment, the pump bores 142A and 142B are on the order of 5-10° apart relative to the outer diameter circumference of the rotor 22, while the arc-shaped wall 34 defines a wall arc segment α that extends approximately 180° between the end portion wall 34-2 and the free end 34-2, extends approximately 175° from the release bore 36 and approximately 150-155° from the trailing pump bore 142B while the end portion wall 34-1 is located approximately 8-10° from the release bore 36 in the opposite circumferential direction. In various example embodiments, the circumferential bore arc segment $\theta_1$ occupied by all of the bores 36, 140A, and 140B can be less than 75%, less than 66%, less than 50%, less than 33%, less than 25%, or less than 15% of the wall arc segment a of the arc-shaped wall 34. In various other example embodiments, the circumferential wall arc segment $\theta_1$ occupied by all of the bores 36, 140A, and 140B can be less than or equal to 45°, less than or equal to 30°, or less than or equal to 20°, relative to the axis of rotation A. Furthermore, the arc segment $\theta_1$ occupied by all of the bores 36, 140A, and 140B can be circumferentially spaced from the free end 34-2 of the arc-shaped wall 34, such as by being closer to the end portion wall 34-1.

In general, the particular sizes and shapes of the individual components of the pump and wiper sub-assemblies 138A and 138B can be modified as desired for particular application in order to provide desired pumping rates over expected operating conditions. For example, pumping rates can be tailored to desired operating characteristics by adjusting pump bore and wiper sizes and shapes depending on anticipated clutch input speeds, or the like.

In the illustrated embodiment, there is no valve associated with any of the pump bores 142A or 142B, which are always open under all clutch operating conditions. But the valve 46 can selectively cover and uncover (or block and unblock) the release bore 36 in order to the output slip speed of the clutch 120.

Figure 8:
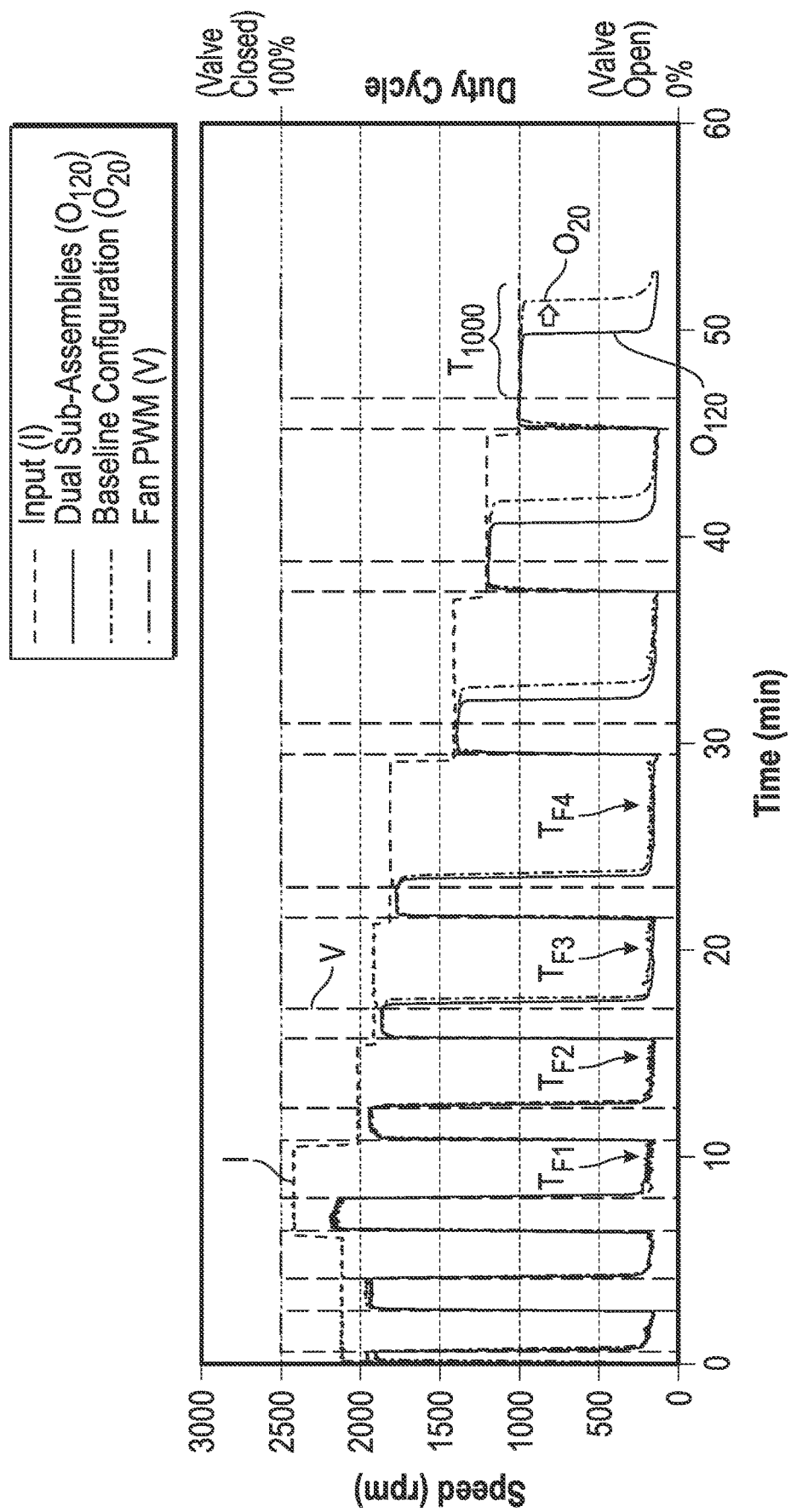
FIG. 8 is a graph illustrating plots of viscous clutch engagement versus both speed and duty cycle for single and dual pump and wiper assemblies.

The addition of the second pump and wiper sub-assembly 138B has been demonstrated to reduce the time to disengage the clutch 120 in testing. FIG. 8 is a graph illustrating plots of clutch engagement versus input speeds for single and dual pump and wiper assemblies 38 and 138. The horizontal axis denotes time (in minutes). The left-hand vertical axis denotes speed in revolutions per minute (RPM), while the right-hand vertical axis denotes pulse width modulation (PWN) duty cycle of the valve 46, with 100% representing full closure of the valve 46 and 0% representing a fully open condition of the valve 46. In the test for which results are plotted in FIG. 8, a clutch 120 with a dual pump and wiper assembly 138 according to the embodiment shown in FIGS. 5-7 with a leading pump bore 142A of 2.25 mm diameter and a trailing pump bore 142B of 3 mm diameter was configured for driving an 813 mm diameter Horton® HS 11 fan (available from Horton, Inc., Roseville, Minn., USA). The baseline clutch 20 had a single pump and wiper assembly 38 like that shown in FIGS. 1-4 with a single 2.5 mm diameter pump bore 42, and drove the same fan. FIG. 8 includes plots of input speed I, valve duty cycle signals V, clutch 120 output speed $O_{120}$, and clutch 20 output speed $O_{20}$.

As shown in FIG. 8, a performance difference in clutch response times is most apparent at relatively low input speeds I, where the clutches 20 and 120 have the least amount of speed differential between the input and the output (e.g., between the rotor 22 and the housing 26) available. In the case of the input speed I being 1000 rpm (see reference $T_{1000}$ in FIG. 8), the baseline clutch 20 with a single pump and wiper assembly 38 disengaged after approximately 5 minutes from the time of the command to disengage, whereas the clutch 120 with the dual pump and wiper assembly 138 dis-engaged after approximately 3 minutes, meaning the baseline clutch 20 took approximately 40% longer to disengage. Those results are shown by the valve duty cycle signals V switching to 100%, which closed the valves 46, followed by corresponding drops in the dual pump and baseline clutch output speed plots $O_{120}$ and $O_{20}$, with the baseline clutch output speed plot $O_{20}$ shifted significantly to the right along the horizontal (time) axis relative to the dual pump output speed plot $O_{120}$ (represented by an arrow) indicating less responsiveness. At lower input speeds I, both clutches 20 and 120 tend to have an output speed plateau period immediately after the valve duty cycle signal V goes to 100%, when the output speeds $O_{120}$ and $O_{20}$ decrease relatively little, before the output speeds $O_{120}$ and $O_{20}$ then decline quickly as shown by relatively steep drops in the output speed plots $O_{120}$ and $O_{20}$. But the dual pump clutch 120 had shorter plateaus and showed steep drops in output speed $0120$ sooner than for the baseline single pump clutch 20 in output speed plot $O_{20}$. At higher input speeds I, the drops in output speeds $O_{120}$ and $O_{20}$ of both clutches 20 and 120 occurred relatively quickly, without appreciable initial output speed plateaus, but the dual pump clutch 120 still exhibited faster drops in clutch output speed $O_{120}$ compared to the output speed $O_{20}$ of the baseline clutch 20. The dual pump and wiper assembly 138 also showed reduced flutter in the fully disengaged condition (see, e.g., references $T_{F1}$ to $T_{F4}$ in FIG. 8), indicating that there was less of a tendency for low level engagement/disengagement cycling when the valve duty cycle signal V is at 100% and rotation of the fan is sought to be ceased. The graph in FIG. 8 also shows that the dual pump and wiper clutch 120 was also able to engage at every speed, indicating no appreciable negative effects of too much pumping, though the dual pump and wiper assembly 138 did produce slightly lower though still acceptable output speeds $O_{120}$ at the highest input speeds (approximately 2100 RPM or higher), when even the baseline clutch 20 produced output speeds $O_{20}$ below the input speed I at a 100% valve duty cycle V. Moreover, the engagement times for both clutches 20 and 120 after switching to a 0% valve duty cycle V were nearly indistinguishable, indicating that the dual pump and wiper assembly 138 had no negative effect on clutch engagement responsiveness.

Figure 9:
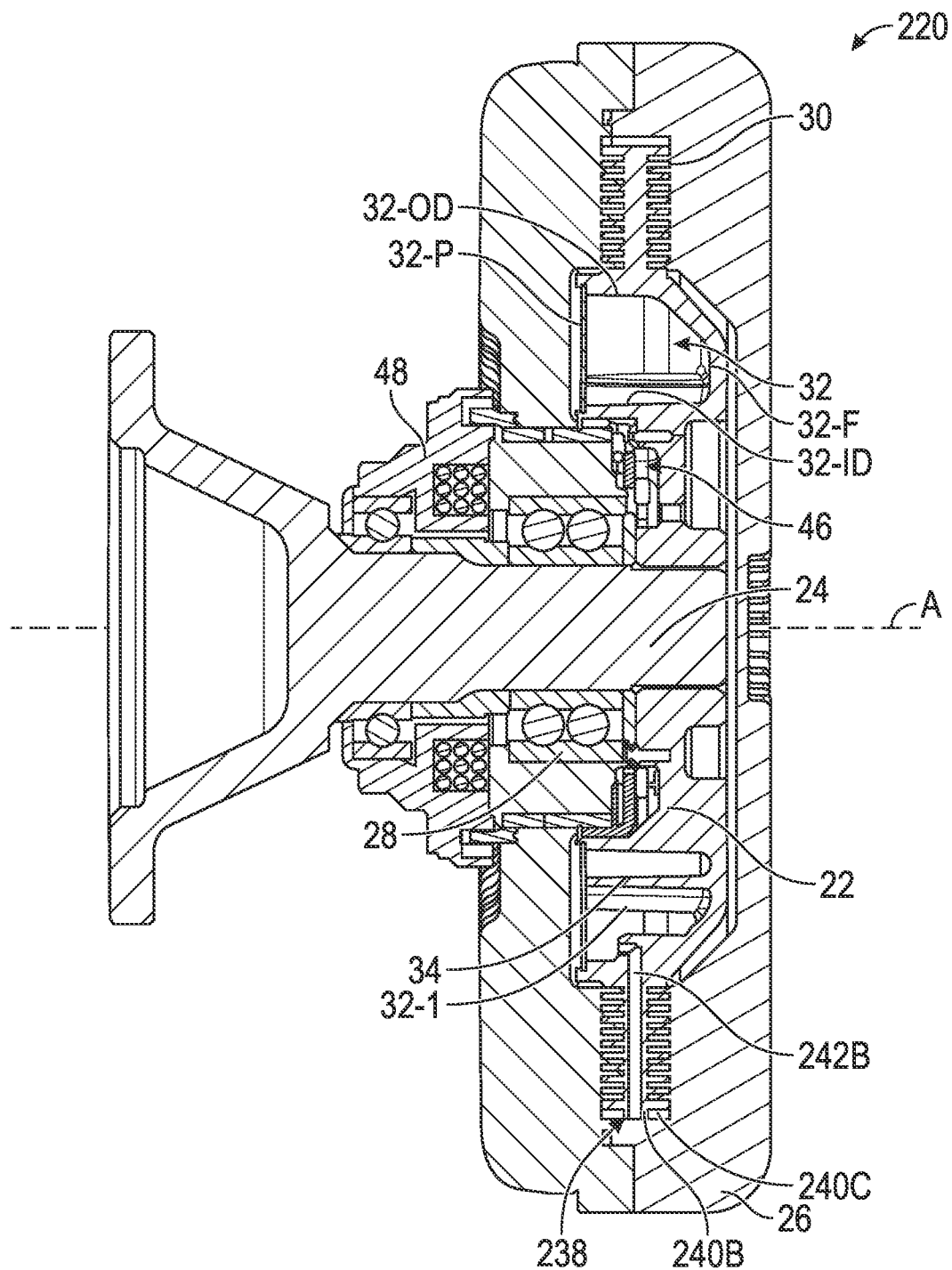
FIG. 9 is a cross sectional view of yet another embodiment of a viscous clutch.
Figure 10:
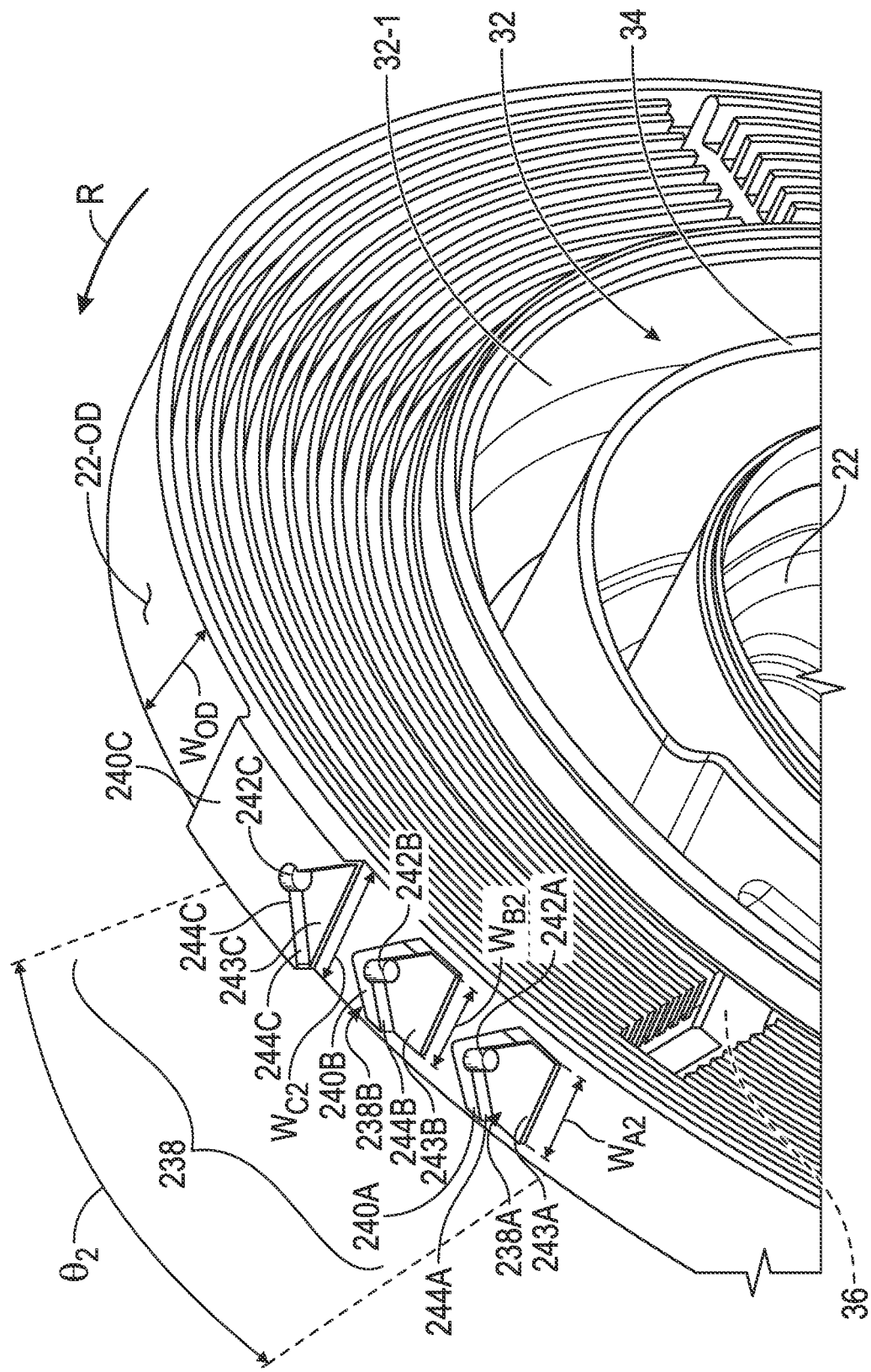
FIG. 10 is a rear perspective view of a rotor, a reservoir, and a pump and wiper assembly of the viscous clutch of FIG. 9, shown in isolation.

Adding one or more additional (that is, third, fourth, etc.) pump and wiper sub-assemblies is also contemplated. FIG. 9 is a cross sectional view of yet another embodiment of a viscous clutch 220, and FIG. 10 is a rear perspective view of certain components of the viscous clutch 220 of FIG. 9. More particularly, FIG. 10 illustrates a triple pump and wiper sub-assembly embodiment. Many components of the clutch 220 shown in FIG. 9 (for instance, the rotor 22, the input shaft 24, the housing 26, the working chamber 30, the reservoir 32, the arc-shaped wall 34, the release bore 36, and the valve 46) can be similar or identical to those described above with respect to the clutch 20 of FIG. 1 and/or the clutch 120 of FIG. 5, or in alternative embodiments can have other configurations as desired for particular applications.

In the illustrated embodiment of FIG. 10, a pump and wiper assembly 238 on the rotor 22 includes a leading (or initial) pump and wiper sub-assembly 238A and an intermediate (or middle) pump and wiper sub-assembly 238B having identical configurations, plus a trailing pump and wiper sub-assembly 238C having a different configuration. In further embodiments, each sub-assembly 238A-238C could have a different configuration than all others, or, alternatively, each could have identical configurations.

The sub-assemblies 238A-238C are arranged in series relative to a circumference of the outer diameter surface 22-OD of the rotor 22 and can concurrently pump the shear fluid during a given clutch operational condition through corresponding pump bores. The initial or leading sub-assembly 238A is located upstream relative to the intermediate (or middle) sub-assembly 238B, which in turn is located upstream of the following or trailing subassembly 238C, which is located downstream relative to both the sub-assemblies 238A and 238C, and each of the sub-assemblies 238A, 238B, and 238C can be arranged to operate to pump the shear fluid to the reservoir 32 when the clutch 220 has a torque input in the same rotational direction (indicated by arrow R) such that the shear fluid encounters all of the sub-assemblies 238A, 238B, and 238C from the same circumferential side (in fluidic flow series for unidirectional operation). As discussed above, upstream in this context refers to portions of the outer diameter of the rotor 22 that tend to encounter shear fluid at a given location within the working chamber 30 earlier, due to the rotation of the rotor 22 and shearing of the shear fluid. In the illustrated embodiment, each sub-assembly 238A-238C includes a wiper 240A, 240B, or 240C that protrudes from the rotor 22 (for instance, radially outward from the outer diameter surface 22-OD of the rotor 22) and an associated pump bore 242A, 242B, or 242C in fluid communication with the reservoir 32. In the illustrated embodiment the pump bores 242A, 242B, and 242C are each located at an upstream side of the respective wipers 240A, 240B, and 240C, that is, the pump bores 242A, 242B, and 242C are each positioned to the same circumferential side of the corresponding wipers 240A, 240B, and 240C. Additionally, each sub-assembly 2388A, 238B, and 238C can include a front platform 243A, 243B, or 243C and a recess 244A, 244B, or 244C in the corresponding wiper 240A, 240B, or 240C. The pump bores 242A, 242B, and 242C can each be located at or in the recess 244A, 244B, or 244C in the respective wiper 240A, 240B, or 240C, and the front platforms 243A, 243B, and 243C can each extend upstream of the respective pump bore 242A, 242B, or 244C and be positioned at least partially (or entirely) within the respective recess 244A, 244B or 244C. Alternatively, such as in embodiments in which the platforms 243A, 243B, and/or 243C and/or the recesses 244A, 244B, and/or 244C are omitted entirely, the pump bores 242A, 242B, and/or 242C can have entrances located adjacent to and upstream from the respective wipers 240A, 240B, and/or 240C. The front platforms 243A, 243B, and 244C can radially protrude from the outer diameter surface 22-OD of the rotor 22 by a smaller amount than the wipers 240A, 240B, and 240C, thus aiding in fluid pressurization to pump the shear fluid but still allowing fluid flow into the pump bores 242A, 242B, and 242C. In the illustrated embodiment, the recesses 244A, 244B, and 244C each have a generally triangular shape, like the recesses 44, 144A, and 144B of the previously disclosed embodiments. In the illustrated embodiment, the platforms 243A, 243B, and 243C and the recesses 244A, 244B, and 244C directly adjoin the respective wiper 240A, 240B, and 240C at an upstream side. During operation, pressure can be passively built up at the entrance to the pump bores 242A, 242B, and 242C by the respective wipers 240A, 240B, and 240C due to a speed differential between the input (e.g., rotor 22) and output (e.g., housing 26) of the clutch 120.

The initial or leading sub-assembly wiper 240A can have an axial width $W_{A2}$ that is less than an axial width $W_{OD}$ of the outer diameter surface 22-OD of the rotor 22 and/or less than an axial width $W_{C2}$ of the trailing wiper 240C, which allows some shear fluid to bypass the pump and wiper sub-assembly 238A and pass downstream to either or both of the intermediate subassembly 238B and the trailing sub-assembly 238B to feed the intermediate and/or trailing pump bores 242B and/or 242C. In some embodiments, the wiper 240A could additionally or alternatively have a smaller radial height above the outer diameter surface 22-OD than the trailing wiper 240C and/or the intermediate (or middle) wiper 240B, though in the illustrated embodiment the wipers 240A, 240B, and 240C all have substantially the same radial heights. The smaller size of the wiper 240A means that the initial or leading wiper 240A does not fully occupy an associated local region of the working chamber 30 adjacent to the outer diameter surface 22-OD of the rotor 22, but rather, in section, a significant adjacent area of the working chamber 30 is unobstructed by the wiper 240A to allow some flow of the shear fluid present in the working chamber 30 to pass by (or bypass) the leading or initial sub-assembly 238A. At least a portion of the volume of the shear fluid that passed by the leading wiper 240A can then enter the intermediate pump bore 242B and/or the trailing pump bore 242C.

The wiper 240A can have a chevron shape or "V" shape that complements the triangular shape of the recess 244A. In further embodiments, the wiper 240A can have a curved trailing edge shape and/or a curved recess 244A, or have other suitable shapes. The platform 243A can extend upstream from the recess 244A and the wiper 240A, for instance with a curved but generally rectangular perimeter. In the illustrated embodiment, the shape of the wiper 240A at its trailing or downstream edge is configured such that the trailing edge of the wiper 240A is circumferentially spaced from the wiper 240B (and its platform 243B) by a smaller distance in an axially middle portion (near the pump bore 242A) than at axially forward and rear locations, which can help facilitate shear fluid flow to the intermediate pump bore 242B. Furthermore, the wiper 240A of the leading sub-assembly 238A can have a trailing edge shape that complements the shape of the recess 244B of the intermediate sub-assembly 238B.

The components of the intermediate sub-assembly 238B can be similar or identical to those of the leading sub-assembly 238A. That is, aside from their respective positions relative to the circumference of the outer diameter surface 22-OD, the wipers 240A and 240B, the pump bores 242A and 244B, the platforms 243A and 243B, and the recesses 244A and 244B can have similar or identical configurations, such as the wiper 240B having a chevron shape or "V" shape. The intermediate wiper 240B can have an axial width $W_{B2}$ that is smaller than the axial width $W_{C2}$ of the trailing wiper 240C. In the illustrated embodiment, the intermediate wiper 240B has an axial width $W_{B2}$ that is substantially equal to the axial width $W_{A2}$ of the leading wiper 240A. At least a portion of the volume of the shear fluid that passed by (or bypassed) the leading wiper 240A can then enter the intermediate pump bore 242B and/or the trailing pump bore 242C, and likewise at least a portion of the volume of shear fluid that passes by (or bypasses) the intermediate wiper 240B can then enter the trailing pump bore 242C. Furthermore, the wiper 240B of the intermediate sub-assembly 238B can have a trailing edge shape that complements the shape of the recess 244C of the trailing sub-assembly 238C. As discussed further below, the leading and intermediate pump and wiper sub-assemblies 238A and 238B can be configured differently than the trailing pump and wiper sub-assembly 238C.

The trailing sub-assembly wiper 240C can have a generally rectangular prism shape (curved to match the curvature of the outer diameter surface 22-OD) into which the recess 244B extends. The trailing wiper 240C has an axial width $W_{C2}$ that is greater than the axial width $W_{A2}$ of the leading wiper 240A and/or greater than the axial width $W_{B2}$ of the intermediate wiper 240B, and in the illustrated embodiment is substantially equal to the axial width $W_{OD}$ of the outer diameter surface 22-OD of the rotor 22, which allows some shear fluid to bypass the pump and wiper sub-assemblies 238A and 238B and pass downstream to the trailing sub-assembly 238C. In some embodiments, the trailing wiper 240C could additionally or alternatively have a greater radial height above the outer diameter surface 22-OD than the leading wiper 240A and/or the intermediate wiper 240B, though in the illustrated embodiment the wipers 240A, 240B, and 240C have substantially the same radial heights. The trailing wiper 240C can be sized in order to essentially fully occupy an associated local region of the working chamber 30 adjacent to the outer diameter surface 22-OD of the rotor 22, such that all or nearly all of the shear fluid in the working chamber 30 outward of the outer diameter surface 22-OD that encounters the trailing pump and wiper sub-assembly 238C is pumped into the pump bore 242C. The platform 243C of the illustrated embodiment does not extend upstream from the recess 244C and the wiper 240C, but instead is contained within the recess 244C and has a leading edge aligned with the upstream-most parts of the wiper 240C.

As already noted, the wiper 240A of the initial sub-assembly 238A has width $W_{A2}$ that is narrower than the width $W_{OD}$ of the outer diameter surface 22-OD of the rotor 22, and likewise the wiper 240B of the intermediate sub-assembly 238B has width $W_{B2}$ that is narrower than the width $W_{OD}$. This configuration allows some of the shear fluid present in the working chamber 30 to flow past both the initial and intermediate sub-assembly wipers 240A and 240B (and pump bores 242A and 242B) and feed the pump bore 242C of the trailing sub-assembly 238C during operation of the clutch 220. This configuration further allows some of the shear fluid present in the working chamber 30 to flow past the initial sub-assembly wiper 240A (and pump bore 242A) and feed the pump bore 242B of the intermediate sub-assembly 238B during operation of the clutch 220. Furthermore, the pump bores 242A, 242B, and 242C of at least some of the sub-assemblies 238A, 238B, and 238C can have different sizes. For instance, the leading pump bore 242A can be smaller (for example, 2.25 mm in diameter) than the trailing pump bore 242C (for example, 3 mm in diameter), and the intermediate pump bore 242B can be smaller than the trailing pump bore 242C such as by being the same size as the leading pump bore 242A. As one non-limiting example, a diameter of the leading and intermediate pump bores 242A and 242B can each be 75% of a diameter of the trailing pump bore 242C. Such a configuration makes pumping by the initial and intermediate sub-assemblies 238A and 238B less effective than pumping by the trailing sub-assembly 238C particularly at high differential speeds. In some embodiments, the diameters of the bores 242A, 242B, and 242C can each be substantially constant between the respective entrances and exits, but in other embodiments can vary, in which case bore diameters can be compared at the narrowest respective diameters. In further embodiments, the intermediate pump bore 242B can be a different size than both the leading and trailing pump bores 242A and 242C, such as a diameter that is larger than a diameter of the leading pump bore 242A but smaller than a diameter of the trailing pump bore 242C. The multiple pump and wiper sub-assemblies 238A, 238B, and 238C create a situation where the overall pump and wiper assembly 238 is relatively more effective in the condition of a small speed differential between the rotor 22 and housing 26 (such as at or near full clutch engagement) and relatively less effective in the case of a large speed differential (such as at or near a disengaged/off condition). In this way, the pumping rate of the pump and wiper assembly 238 is not at a fixed proportion in relation to variable clutch input speeds. For example, a total rate of pumping from the working chamber 30 to the reservoir 32 by the pump and wiper assembly 238 is greater when a speed differential between the rotor 22 and the housing 26 (or more generally, between a clutch input and a clutch output) is relatively low, such as 10% or less, than when the speed differential between the clutch input and a clutch output is relatively high, such as greater than 50%.

Because the exits of the pump bores 242A, 242B, and 242C are, circumferentially, very close to one another (for example, circumferentially within approximately 45°, approximately 25°, approximately 15°, approximately 10°, approximately 5°, or less than 5° relative to the axis of rotation A of the clutch 220), there is essentially no impact regarding the trapping of shear fluid in the reservoir 32 with the arc-shaped wall 34 when the clutch 220 is shut down. The arc-shaped wall 34 extends significantly further in the circumferential direction that the spacing between the leading and trailing pump bores 240A and 240C. Moreover, in the illustrated embodiment, at least the respective entrance or exits of all of the bores 36, 240A, 240B, and 240C that directly fluidically connect to the reservoir 32 overlap with and are positioned within the wall arc segment $\alpha$ of the arc-shaped wall 34, with all of the bores 36, 240A, 240B, and 240C positioned to circumferentially overlap the arc-shaped wall 34 and be circumferentially between the end portion wall 34-1 (and the closed end of the first portion 32-1 of the reservoir 32) and the free end 34-2 (and the open end of the first portion 32-1 of the reservoir 32). All of the bores 36, 240A, 240B and 240C collectively define a circumferential bore arc segment $\theta_2$ relative to the axis of rotation A, such that, at least in some embodiments, there are no bores connecting the reservoir 32 to the working chamber 30 outside of the bore arc segment $\theta_2$. In the illustrated embodiment, the pump bores 242A, 242B, and 242C are on the order of 5-10° apart from each other relative to the outer diameter circumference of the rotor 22, while the arc-shaped wall 34 extends approximately 180° between the end portion wall 34-2 and the free end 34-2, extends approximately 175° from the release bore 36 and approximately 150-155° from the trailing pump bore 242C while the end portion wall 34-1 is located approximately 8-10° from the release bore 36 in the opposite circumferential direction. In various example embodiments, the circumferential bore arc segment $\theta_2$ occupied by all of the bores 36, 240A, 240B and 240C can be less than 75%, less than 66%, less than 50%, less than 33%, less than 25%, or less than 15% of the wall arc segment $\alpha$ of the arc-shaped wall 34. In various other example embodiments, the circumferential arc segment $\theta_2$ occupied by all of the bores 36, 240A, 240B and 240C can be less than or equal to 45°, less than or equal to 30°, or less than or equal to 20°, relative to the axis of rotation A. The arc segment $\theta_2$ occupied by all of the bores 36, 240A, 240B, and 240C can also be circumferentially spaced from the free end 34-2 of the arc-shaped wall 34, such as by being closer to the end portion wall 34-1. Furthermore, by way of comparison, the leading pump bore 242A can be located in substantially the same circumferential position as the leading pump bore 142A of the dual-pump embodiment discussed above, while the trailing pump bore 242C can be located circumferentially further from the release bore 36 than the trailing pump bore 142B in some embodiments.

In general, the particular sizes and shapes of the individual components of the pump and wiper sub-assemblies 238A, 238B, and 238C can be modified as desired for particular application in order to provide desired pumping rates over expected operating conditions. For example, pumping rates can be tailored to desired operating characteristics by adjusting pump bore and wiper sizes and shapes depending on anticipated clutch input speeds, or the like. Moreover, in further embodiments, one or more additional pump and wiper sub-assemblies can be provided in the pump and wiper assembly 238 in circumferentially intermediate or middle positions in between the leading and trailing sub-assemblies 238A and 238C. Such additional pump and wiper sub-assemblies can have components configured in a similar or identical manner to the intermediate sub-assembly 238B, aside from positioning along the circumference of the outer diameter surface 22-OD, though in still further embodiments such additional pump and wiper sub-assemblies can have components with different configurations (for example, different pump bore diameters).

In the illustrated embodiment, there is no valve associated with any of the pump bores 242A, 242B, or 242C, which are always open under all clutch operating conditions. But the valve 46 can selectively cover and uncover (or block and unblock) the release bore 36 in order to the output slip speed of the clutch 220.

Discussion of Possible Embodiments

A viscous clutch can include an input member rotatable about an axis of rotation; an output member selectively rotatable about the axis of rotation; a working chamber bounded by the input member and the output member, such that torque can be selectively transmitted between the input member and the output member through fluid frictional forces based upon a volume of a shear fluid present in the working chamber; a reservoir defining an interior volume capable of holding a supply of the shear fluid; an arc-shaped wall positioned within the reservoir, such that the arc-shaped wall defines a first portion of the reservoir having a closed end and an open end, and with the arc-shaped wall extending circumferentially between the open and closed ends over a wall arc segment; a release bore that fluidically connects the reservoir to the working chamber; and a pump and wiper assembly positioned along the working chamber. The pump and wiper assembly can include a leading pump and wiper sub-assembly that includes a leading wiper and a leading pump bore, with the leading pump bore fluidically connecting the working chamber to the reservoir, and with the leading pump bore located adjacent to the leading wiper; and a trailing pump and wiper sub-assembly that includes a trailing wiper and a trailing pump bore, wherein the trailing pump bore fluidically connects the working chamber to the reservoir, wherein the trailing pump bore is located adjacent to the trailing wiper, and with the trailing pump and wiper sub-assembly located downstream from the leading pump and wiper sub-assembly. The release bore, the leading pump bore, and the trailing pump bore can all be directly fluidically connected to the first portion of the reservoir within a bore arc segment that is circumferentially smaller than the wall arc segment of the arc-shaped wall.

The viscous clutch of the preceding paragraph can optionally include, additionally and/or alternatively, any one or more of the following features, configurations and/or additional components:

the reservoir can be rotationally fixed relative to the input member;

the reservoir can be positioned radially inward from the working chamber;

the input member can be or include a rotor disk, the output member can be or include a housing, and the reservoir can be rotationally fixed relative to the rotor disk;

the leading and trailing wipers can each protrude radially outward from an outer diameter surface of the rotor disk;

a valve that is actuatable to selectively control shear fluid flow from the reservoir to the working chamber through the release bore;

the bore arc segment can be circumferentially spaced from the open end of the first portion of the reservoir;

the bore arc segment can be located closer to the closed end of the first portion of the reservoir than to the open end of the first portion of the reservoir;

the first portion of the reservoir can be located at a radially outward side of the arc-shaped wall;

the leading pump bore can have a diameter that is smaller than a diameter of the trailing pump bore;

an intermediate pump and wiper sub-assembly that includes an intermediate wiper and an intermediate pump bore, with the intermediate pump bore fluidically connecting the working chamber to the reservoir, the intermediate pump bore located adjacent to the intermediate wiper, and the intermediate pump and wiper sub-assembly located circumferentially in between the leading pump and wiper sub-assembly;

the intermediate wiper can be chevron shaped;

the leading pump bore can have a diameter that is smaller than a diameter of the trailing pump bore, and the intermediate pump bore can have a diameter that is smaller than the diameter of the trailing pump bore;

the leading wiper can be chevron shaped;

the leading wiper can have a smaller axial width than an axial width of the trailing wiper;

a recess extending into the leading wiper;

the leading pump bore can have an entrance located at or within the recess extending into the leading wiper;

the recess extending into the leading wiper can have a triangular shape;

a recess extending into the trailing wiper;

the trailing pump bore can have an entrance located at or within the recess extending into the trailing wiper;

a platform;

the leading pump bore can have an entrance located at or within the platform;

the wall arc segment can extend 180° or less relative to the axis of rotation;

the release bore, the leading pump bore, and the trailing pump bore can all be located within a bore arc segment of 45° relative to the axis of rotation; and/or the leading pump bore can be located at an upstream side of the leading pump wiper in a first circumferential direction, and the trailing pump bore can be located at an upstream side of the trailing pump wiper in the first circumferential direction.

A method of using a viscous clutch that has a working chamber and a reservoir, where an output slip speed of the viscous clutch is controllable by varying a volume of a shear fluid present in the working chamber, can include: partially shielding a first portion of the reservoir from a remaining portion of the reservoir with a wall; selectively controlling shear fluid flow from the reservoir to the working chamber through a release bore that is directly fluidically connected to the first portion of the reservoir; pumping shear fluid from the working chamber to the reservoir with a leading wiper and a leading pump bore associated with the leading wiper, where the leading pump bore directly fluidically connects to the first portion of the reservoir; and pumping shear fluid from the working chamber to the reservoir with a trailing wiper and a trailing pump bore associated with the trailing wiper, where the trailing pump bore directly fluidically connects to the first portion of the reservoir.

The method of the preceding paragraph can optionally include, additionally and/or alternatively, any one or more of the following features, configurations and/or additional steps:

pumping shear fluid from the working chamber to the reservoir with an intermediate wiper and an intermediate pump bore associated with the intermediate wiper, where the intermediate pump bore directly fluidically connects to the first portion of the reservoir, and where an entrance of the intermediate pump bore is located circumferentially in between an entrance of the leading pump bore and an entrance of the trailing pump bore;

a volume of the shear fluid can circumferentially bypass the leading wiper at a location radially outward from a rotor disk before being pumped through the trailing pump bore;

the step of pumping shear fluid from the working chamber to the reservoir with a leading wiper and an associated leading pump bore can involve only passive pumping;

the step of pumping shear fluid from the working chamber to the reservoir with a trailing wiper and an associated trailing pump bore can involve only passive pumping;

providing a torque input to the viscous clutch in a first rotational direction;

the step of pumping shear fluid from the working chamber to the reservoir with a leading wiper and a leading pump bore associated with the leading wiper and the step of pumping shear fluid from the working chamber to the reservoir with a trailing wiper and a trailing pump bore associated with the trailing wiper can both be performed while the torque input is provided to the viscous clutch in the first rotational direction;

the leading pump bore and the trailing pump bore can pump the shear fluid to the reservoir concurrently; and/or a total rate of pumping from the working chamber to the reservoir can be greater when a speed differential between a clutch input and a clutch output is relatively low than when the speed differential between the clutch input and the clutch output is relatively high.

A viscous clutch can include an input member rotatable about an axis of rotation; an output member selectively rotatable about the axis of rotation; a working chamber bounded by the input member and the output member, wherein torque can be selectively transmitted between the input member and the output member through fluid frictional forces based upon a volume of a shear fluid present in the working chamber; a reservoir defining an interior volume capable of holding a supply of the shear fluid; a release bore that fluidically connects the reservoir to the working chamber; a leading wiper that extends into the working chamber; a leading pump bore positioned adjacent to the leading wiper, wherein the leading pump bore fluidically connects the working chamber to the reservoir; a trailing wiper that extends into the working chamber, wherein the trailing wiper has a width that is greater than a width of the leading wiper in an axial direction; and a trailing pump bore positioned adjacent to the trailing wiper and downstream of the leading pump bore, with the trailing pump bore fluidically connecting the working chamber to the reservoir.

The viscous clutch of the preceding paragraph can optionally include, additionally and/or alternatively, any one or more of the following features, configurations and/or additional components:

an intermediate wiper can extend into the working chamber;

the width of the trailing wiper can be greater than a width of the intermediate wiper in the axial direction;

an intermediate pump bore can be positioned adjacent to the intermediate wiper and downstream of the leading pump bore, with the intermediate pump bore fluidically connecting the working chamber to the reservoir;

a wall can be positioned within the reservoir that separates a first portion of the reservoir from a remaining portion of the reservoir;

the first portion of the reservoir can have a closed end and a circumferentially opposite open end; and/or the release bore, the leading pump bore, and the trailing pump bore can each be directly fluidically connected to the first portion of the reservoir;

A rotor assembly for a viscous clutch can include a rotor disk having an outer diameter surface; a reservoir carried with the rotor disk, such that the reservoir is located radially inward from the outer diameter surface of the rotor disk; a leading wiper that radially protrudes from the outer diameter surface of the rotor disk; a leading pump bore positioned adjacent to the leading wiper, such that the leading pump bore extends from the outer diameter surface of the rotor disk to the reservoir; a trailing wiper that radially protrudes from the outer diameter surface of the rotor disk, such that the trailing wiper has a width that is greater than a width of the leading wiper in an axial direction; and a trailing pump bore positioned adjacent to the trailing wiper and downstream of the leading pump bore, such that the trailing pump bore extends from the outer diameter surface of the rotor disk to the reservoir.

The rotor assembly of the preceding paragraph can optionally include, additionally and/or alternatively, any one or more of the following features, configurations and/or additional components:

an intermediate wiper can radially protrude from the outer diameter surface of the rotor disk;

the width of the trailing wiper can be greater than a width of the intermediate wiper in an axial direction;

an intermediate pump bore can be positioned adjacent to the intermediate wiper and downstream of the leading pump bore, such that the intermediate pump bore extends from the outer diameter surface of the rotor disk to the reservoir;

a wall can be positioned within the reservoir that separates a first portion of the reservoir from a remaining portion of the reservoir;

the first portion of the reservoir can have a closed end and a circumferentially opposite open end;

the leading pump bore and the trailing pump bore can each be directly fluidically connected to the first portion of the reservoir;

a release bore can extend through part of the rotor; and/or the release bore can be directly fluidically connected to the first portion of the reservoir.

A method of using a viscous clutch having a working chamber, a reservoir, and a rotor disk, with an output slip speed of the viscous clutch being controllable by varying a volume of a shear fluid present in the working chamber, can include: delivering shear fluid from the reservoir to the working chamber through a release bore that is directly fluidically connected to the first portion of the reservoir; pumping shear fluid from the working chamber to the reservoir with a leading wiper and a leading pump bore associated with the leading wiper; passing a volume of the shear fluid by the leading wiper in a circumferential direction at a location radially outward from the rotor disk; and pumping shear fluid from the working chamber to the reservoir with a trailing wiper and a trailing pump bore associated with the trailing wiper. At least a portion of the volume of the shear fluid that passed by the leading wiper can enter the trailing pump bore.

The method of the preceding paragraph can optionally include, additionally and/or alternatively, any one or more of the following features, configurations and/or additional steps:

the leading pump bore and the trailing pump bore can pump the shear fluid to the reservoir concurrently; and/or a total rate of pumping from the working chamber to the reservoir can be greater when a speed differential between a clutch input and a clutch output is relatively low than when the speed differential between the clutch input and the clutch output is relatively high.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For example, while illustrated embodiments depict a pump and wiper assembly carried by a rotor, the presently disclosed pump and wiper assembly could equally be implemented on a housing in alternative embodiments, such as with viscous clutches having a reservoir in the housing and/or having the housing as the clutch input. In a clutch with a housing input, for instance, the pump and wiper assembly can be implemented with the pump and wiper sub-assemblies positioned on or at a radially inward facing surface of the housing that borders the working chamber. Alternatively, the pump and wiper assembly can be positioned on the output member. In still further embodiments, the pump and wiper assembly can be positioned at or along any portion of the boundary of the working chamber, on either the input or output member of the clutch. Moreover, while FIGS. 1, 5, and 9 illustrates possible configurations of a viscous clutch in which disclosed pump and wiper assemblies can be implemented, persons of ordinary skill in the art will recognize that the presently disclosed pump and wiper assemblies can be implemented on viscous clutches having other configurations, such as on viscous clutches with direct-sensing bimetal-controlled valves and on electromagnetically-controlled clutches having different types of valves and/or different types of shafts (e.g., clutches with non-rotating or fixed central support shafts), or even on clutches that lack a valve and operate merely on the basis of input speed. Lastly, while illustrated embodiments show wipers that are integrally and monolithically formed with another clutch component (such as an input member or rotor disk), in further embodiments any given wiper could be a separate element attached to the other clutch component in a suitable manner.

The invention claimed is:

1. A viscous clutch comprising:
    an input member rotatable about an axis of rotation;
    an output member selectively rotatable about the axis of rotation;
    a working chamber bounded by the input member and the output member, wherein torque can be selectively transmitted between the input member and the output member through fluid frictional forces based upon a volume of a shear fluid present in the working chamber;
    a reservoir defining an interior volume capable of holding a supply of the shear fluid;
    an arc-shaped wall positioned within the reservoir, wherein the arc-shaped wall defines a first portion of the reservoir having a closed end and an open end, and wherein the arc-shaped wall extends circumferentially between the open and closed ends over a wall arc segment;
    a release bore that fluidically connects the reservoir to the working chamber; and
    a pump and wiper assembly positioned along the working chamber, the pump and wiper assembly comprising:
        a leading pump and wiper sub-assembly that includes a leading wiper and a leading pump bore, wherein the leading pump bore fluidically connects the working chamber to the reservoir, and wherein the leading pump bore is located adjacent to the leading wiper; and
        a trailing pump and wiper sub-assembly that includes a trailing wiper and a trailing pump bore, wherein the trailing pump bore fluidically connects the working chamber to the reservoir, wherein the trailing pump bore is located adjacent to the trailing wiper, and wherein the trailing pump and wiper sub-assembly is located downstream from the leading pump and wiper sub-assembly,
    wherein the release bore, the leading pump bore, and the trailing pump bore are all directly fluidically connected to the first portion of the reservoir within a bore arc segment that is circumferentially smaller than the wall arc segment of the arc-shaped wall.

2. The viscous clutch of claim 1, wherein the input member comprises a rotor disk, wherein the output member comprises a housing, wherein the reservoir is rotationally fixed relative to the rotor disk, and wherein the leading and trailing wipers each protrude radially outward from an outer diameter surface of the rotor disk.

3. The viscous clutch of claim 1 and further comprising:
    a valve that is actuatable to selectively control shear fluid flow from the reservoir to the working chamber through the release bore.

4. The viscous clutch of claim 1, wherein the bore arc segment is circumferentially spaced from the open end of the first portion of the reservoir, and wherein the bore arc segment is located closer to the closed end of the first portion of the reservoir than to the open end of the first portion of the reservoir.

5. The viscous clutch of claim 1, wherein the leading pump bore has a diameter that is smaller than a diameter of the trailing pump bore.

6. The viscous clutch of claim 1 and further comprising:
    an intermediate pump and wiper sub-assembly that includes an intermediate wiper and an intermediate pump bore, wherein the intermediate pump bore fluidically connects the working chamber to the reservoir, wherein the intermediate pump bore is located adjacent to the intermediate wiper, and wherein the intermediate pump and wiper sub-assembly is located circumferentially in between the leading and trailing pump and wiper sub-assemblies.

7. The viscous clutch of claim 6, wherein the intermediate wiper is chevron shaped, wherein the leading pump bore has a diameter that is smaller than a diameter of the trailing pump bore, and wherein the intermediate pump bore has a diameter that is smaller than the diameter of the trailing pump bore.

8. The viscous clutch of claim 1, wherein the leading wiper is chevron shaped.

9. The viscous clutch of claim 1, wherein the leading wiper has a smaller axial width than an axial width of the trailing wiper.

10. The viscous clutch of claim 1 and further comprising:
    a recess extending into the leading wiper, wherein the leading pump bore has an entrance located at or within the recess extending into the leading wiper.

11. The viscous clutch of claim 1 and further comprising:
    a recess extending into the trailing wiper, wherein the trailing pump bore has an entrance located at or within the recess extending into the trailing wiper.

12. The viscous clutch of claim 1 and further comprising:
    a platform, wherein the leading pump bore has an entrance located at or within the platform.

13. The viscous clutch of claim 1, wherein the wall arc segment extends 180° or less relative to the axis of rotation.

14. The viscous clutch of claim 1, wherein the release bore, the leading pump bore, and the trailing pump bore are all located within a bore arc segment of 45° relative to the axis of rotation.

15. The viscous clutch of claim 1, wherein the leading pump bore is located at an upstream side of the leading pump wiper in a first circumferential direction, and wherein the trailing pump bore is located at an upstream side of the trailing pump wiper in the first circumferential direction.

16. A method of using a viscous clutch that includes a working chamber and a reservoir, wherein an output slip speed of the viscous clutch is controllable by varying a volume of a shear fluid present in the working chamber, the method comprising:
    partially shielding a first portion of the reservoir from a remaining portion of the reservoir with a wall;
    selectively controlling shear fluid flow from the reservoir to the working chamber through a release bore that is directly fluidically connected to the first portion of the reservoir;

pumping the shear fluid from the working chamber to the reservoir with a leading wiper and a leading pump bore associated with the leading wiper, wherein the leading pump bore directly fluidically connects to the first portion of the reservoir; and pumping the shear fluid from the working chamber to the reservoir with a trailing wiper and a trailing pump bore associated with the trailing wiper, wherein the trailing pump bore directly fluidically connects to the first portion of the reservoir.

17. The method of claim 16 and further comprising:

pumping the shear fluid from the working chamber to the reservoir with an intermediate wiper and an intermediate pump bore associated with the intermediate wiper, wherein the intermediate pump bore directly fluidically connects to the first portion of the reservoir, and wherein an entrance of the intermediate pump bore is located circumferentially in between an entrance of the leading pump bore and an entrance of the trailing pump bore.

18. The method of claim 16, wherein a volume of the shear fluid circumferentially bypasses the leading wiper at a location radially outward from a rotor disk before being pumped through the trailing pump bore.

19. The method of claim 16 and further comprising:

providing a torque input to the viscous clutch in a first rotational direction, wherein the step of pumping the shear fluid from the working chamber to the reservoir with the leading wiper and the leading pump bore associated with the leading wiper and the step of pumping the shear fluid from the working chamber to the reservoir with the trailing wiper and the trailing pump bore associated with the trailing wiper are both performed while the torque input is provided to the viscous clutch in the first rotational direction.

20. The method of claim 16, wherein a total rate of pumping from the working chamber to the reservoir is greater when a speed differential between a clutch input and a clutch output is relatively low than when the speed differential between the clutch input and the clutch output is relatively high.

21. A viscous clutch comprising:

an input member rotatable about an axis of rotation;

an output member selectively rotatable about the axis of rotation;

a working chamber bounded by the input member and the output member, wherein torque can be selectively transmitted between the input member and the output member through fluid frictional forces based upon a volume of a shear fluid present in the working chamber;

a reservoir defining an interior volume capable of holding a supply of the shear fluid;

a release bore that fluidically connects the reservoir to the working chamber;

a leading wiper that extends into the working chamber;

a leading pump bore positioned adjacent to the leading wiper, wherein the leading pump bore fluidically connects the working chamber to the reservoir;

a trailing wiper that extends into the working chamber, wherein the trailing wiper has a width that is greater than a width of the leading wiper in an axial direction; and a trailing pump bore positioned adjacent to the trailing wiper and downstream of the leading pump bore, wherein the trailing pump bore fluidically connects the working chamber to the reservoir.

22. The viscous clutch of claim 21 and further comprising:

an intermediate wiper that extends into the working chamber, wherein the width of the trailing wiper is greater than a width of the intermediate wiper in the axial direction; and an intermediate pump bore positioned adjacent to the intermediate wiper and downstream of the leading pump bore, wherein the intermediate pump bore fluidically connects the working chamber to the reservoir.

23. The viscous clutch of claim 21 and further comprising:

a wall positioned within the reservoir that separates a first portion of the reservoir from a remaining portion of the reservoir, wherein the first portion of the reservoir has a closed end and a circumferentially opposite open end, and wherein the release bore, the leading pump bore, and the trailing pump bore are each directly fluidically connected to the first portion of the reservoir.

* * * * *

UNITED STATES PATENT AND TRADEMARK OFFICE
CERTIFICATE OF CORRECTION

| | |
|---|---|
| PATENT NO. | : 11,441,621 B2 |
| APPLICATION NO. | : 17/310058 |
| DATED | : September 13, 2022 |
| INVENTOR(S) | : David R. Hennessy |

It is certified that error appears in the above-identified patent and that said Letters Patent is hereby corrected as shown below:

In the Claims

In Claim 15, Column 26, Lines 53-54:
Please delete "leading pump wiper"
And insert --leading wiper--

In Claim 15, Column 26, Line 56:
Please delete "trailing pump wiper"
And insert --trailing wiper--

Signed and Sealed this
Twentieth Day of August, 2024

*Katherine Kelly Vidal*

Katherine Kelly Vidal
*Director of the United States Patent and Trademark Office*